US012806857B2

(12) United States Patent
Almubarak et al.

(10) Patent No.: US 12,806,857 B2
(45) Date of Patent: Nov. 24, 2026

(54) METHOD AND APPARATUS FOR PRECISION 3D PRINTING USING BENT NEEDLES

(71) Applicant: Wayne State University, Detroit, MI (US)

(72) Inventors: Yara Almubarak, Detroit, MI (US); Mohammed Al-Ali, Dearborn, MI (US)

(73) Assignee: Wayne State University, Detroit, MI (US)

( * ) Notice: Subject to any disclaimer, the term of this patent is extended or adjusted under 35 U.S.C. 154(b) by 40 days.

(21) Appl. No.: 18/990,091

(22) Filed: Dec. 20, 2024

(65) Prior Publication Data

US 2025/0205969 A1 Jun. 26, 2025

Related U.S. Application Data

(60) Provisional application No. 63/614,099, filed on Dec. 22, 2023.

(51) Int. Cl.

| | |
|---|---|
| ***B29C 41/04*** | (2006.01) |
| ***B29C 41/06*** | (2006.01) |
| ***B29C 41/52*** | (2006.01) |
| ***B29C 48/25*** | (2019.01) |
| ***B29C 48/92*** | (2019.01) |
| ***B29C 64/106*** | (2017.01) |
| ***B29C 64/112*** | (2017.01) |

(Continued)

(52) U.S. Cl.

CPC .......... *B29C 64/209* (2017.08); *B29C 48/266* (2019.02); *B29C 64/118* (2017.08); *B33Y 10/00* (2014.12); *B33Y 30/00* (2014.12); *B29C 2948/92571* (2019.02); *G05B 2219/49008* (2013.01); *G05B 2219/49016* (2013.01); *G05B 2219/49019* (2013.01); *G05B 2219/49021* (2013.01)

(58) Field of Classification Search

CPC ......... B29C 41/04; B29C 41/06; B29C 41/52; B29C 48/266; B29C 48/92; B29C 64/106; B29C 64/112; B29C 64/118; B29C 64/209; B29C 64/241; B29C 64/245; B29C 64/386; B29C 64/393; B29C 2948/92571; B33Y 10/00; B33Y 30/00; B33Y 50/00; B33Y 50/02; G05B 19/4099; G05B 2219/49008; G05B 2219/49016; G05B 2219/49019; G05B 2219/49021

USPC ........ 264/308, 310; 425/135, 375, 461, 462, 425/463; 700/119

See application file for complete search history.

(56) References Cited

U.S. PATENT DOCUMENTS 10,335,991 B2 7/2019 Mandel
10,571,642 B1 2/2020 Cohen
(Continued)

OTHER PUBLICATIONS

International Search Report dated May 30, 2025 for PCT/US2024/061398.

*Primary Examiner* — Leo B Tentoni
(74) *Attorney, Agent, or Firm* — Fishman Stewart PLLC

(57) ABSTRACT

An extruder includes a housing, and a rotator coupled to the housing. The housing includes a first base, a plurality of holes in the first base, and a plurality of nozzle holders on the first base. The rotator rotates the housing during a 3D printing process. According to an implementation, a plurality of nozzles are accommodated in the plurality of nozzle holders. One or more of the plurality of nozzles are bent or curved.

20 Claims, 35 Drawing Sheets

(51) Int. Cl.

| | |
|---|---|
| ***B29C 64/118*** | (2017.01) |
| ***B29C 64/209*** | (2017.01) |
| ***B29C 64/241*** | (2017.01) |
| ***B29C 64/245*** | (2017.01) |
| ***B29C 64/386*** | (2017.01) |
| ***B29C 64/393*** | (2017.01) |
| ***B33Y 10/00*** | (2015.01) |
| ***B33Y 30/00*** | (2015.01) |
| ***B33Y 50/00*** | (2015.01) |
| ***B33Y 50/02*** | (2015.01) |
| ***G05B 19/4099*** | (2006.01) |

(56) References Cited

U.S. PATENT DOCUMENTS

| | | | | |
|---|---|---|---|---|
| 2015/0306823 | A1 | 10/2015 | Askedall | |
| 2016/0325498 | A1 | 11/2016 | Gelbart | |
| 2018/0326660 | A1* | 11/2018 | Gifford | B29C 64/241 |
| 2020/0338822 | A1 | 10/2020 | Davenport | |

* cited by examiner

301
Attachment to Printer
365
Motor
363
361
367
302
303

Internal View
311
312
313
314
315
316
317
318
319
320
331
332
333
334
335
336
337
338
339
340
351
353

Holes
Bottom View
SEE FIG. 3D

Needle 1
Needle 2
Needle 3
Needle 4
$D_{NT}$
$D_{NT}$
$D_{NT}$
Zoomed in Needle Tips

METHOD AND APPARATUS FOR PRECISION 3D PRINTING USING BENT NEEDLES

CROSS REFERENCE TO RELATED APPLICATIONS

This U.S. patent application claims priority under 35 U.S.C. § 119(c) to U.S. Provisional Application 63/614,099, filed on Dec. 22, 2023, the contents of which is considered part of the disclosure of this application and is hereby incorporated by reference in its entirety.

TECHNICAL FIELD

Exemplary fields of technology for the present disclosure relate to 3D printing. More specifically, the disclosure relates to 3D printing using one or more bent noddle (also referred to as "bent nozzle"). The disclosure further relates to 3D printing on internal surfaces of structures.

BACKGROUND

Extrusion-based 3D printing methods, such as Direct Ink Writing, Droplet-Based Printing, and Fused Filament Fabrication, offer significant benefits. However, they face challenges with limited ability to instantly adjust printing parameters for producing objects with functionally graded properties. Additionally, these methods are generally slow, which limits their suitability for complex mass production and rapid prototyping.

Most 3D printers rely on a single small-diameter nozzle (800 μm-100 μm) to achieve high resolution and print quality results. While this ensures precision, it also slows down the printing process and restricts material processing compared to traditional manufacturing techniques. Speeding up the process by increasing the nozzle diameter, printing speed, or material flow rate often compromises print resolution and introduces defects such as surface defects. As a result, small-diameter nozzles are used for most applications, prioritizing quality over speed. However, using a single fixed nozzle also makes it difficult to print with multiple materials simultaneously, which is essential for creating objects with functionally graded properties. Functionally graded printing requires precise control of multiple materials and the ability to adjust their parameters continuously during printing to achieve desired variations in the object's structure.

Another significant limitation of extrusion-based 3D printing is its inability to print on internal surfaces of structures, such as the inside surfaces of pipes. While these methods are commonly used for open flat surfaces and can sometimes print on curved or convex surfaces, such as the exteriors of pipes, they primarily focus on external features. This has left internal surface printing largely unexplored due to the lack of suitable technology for such applications.

SUMMARY

One aspect of the disclosure provides an extruder for printing an object. The extruder includes a housing, and a rotator coupled to the housing. The housing includes a first base, a plurality of holes in the first base, and a plurality of nozzle holders on the first base. The rotator rotates the housing during a 3D printing process.

Implementations of the disclosure may include one or more of the following optional features. In some implementations, the extruder further includes a coupler that couples the extruder to a slider of a 3D printer. In some implementations, the extruder further includes a first plurality of nozzles, each nozzle of the first plurality of nozzles associated with a corresponding nozzle holder of the plurality of nozzle holders. In some implementations, the first plurality of nozzles is bent or curved. In some implementations, at least one of the first plurality of nozzles is bent to an angle between 1° and 359°. In some implementations, each nozzle of the first plurality of nozzles is fluid communication with a printing material source.

In some implementations, the extruder further includes a second base and a second plurality of nozzles on the second base. In some implementations, each nozzle tip of the first plurality of nozzles and each nozzle tip of the second plurality of nozzles faces a printing bed through the plurality of holes in the first base. In some implementations, each nozzle of the first plurality of nozzles is bent to a first angle between 1° and 359°, each nozzle of the second plurality of nozzles is bent to a second angle between 1° and 359°, and the second angle is greater than the first angle. In some implementations, the extruder further includes a third plurality of nozzles. In some implementations, each nozzle of the third plurality of nozzles is bent to a third angle between 1° and 359°. In some implementations, the third angle is greater than the first angle and the second angle.

Another aspect of the disclosure provides a 3D printer for printing on an internal surface of an object. The 3D printer includes a nozzle, a first axis slider associated with the nozzle, a holder for holding an object, and a rotator for rotating the holder during a 3D printing process. The nozzle is bent or curved.

Implementations of the disclosure may include one or more of the following optional features. In some implementations, the 3D printer further includes a second axis slider associated with the first axis slider. In some implementations, the nozzle is configured to insert into a hollow portion of the object as the first axis slider moves forward during the 3D printing process. In some implementations, the 3D printer further includes a print material supplier in fluid communication with the nozzle. In some implementations, the 3D printer further includes a controller. In some implementations, the controller transmits a signal to the first axis slider that causes the nozzle to move along a first axis in a forward direction, a backward direction, or a combination of forward and backward directions during the 3D printing process. In some implementations, the controller transmits a signal to the print material supplier that causes the nozzle to deposit printer material to an internal surface of the object. In some implementations, the controller transmits a signal to the rotator that causes the object to rotate in a clockwise direction, a counterclockwise direction, or a combination of both during the 3D printing process.

Another aspect of the disclosure provides a method of printing a 3D object. The method includes generating 3D geometric data and generating machine instruction data based on the 3D geometric data. The machine instruction data includes instructions for a 3D printer. The instructions include at least one of a first instruction and a second instruction. The first instruction causes an extruder of a first 3D printer to rotate. The second instruction causes a rotator of a second 3D printer to rotate an object, enabling the second 3D printer to print on an internal surface of the object.

Implementations of the disclosure may include one or more of the following optional features. In some implementations, the extruder includes a housing, and a rotator coupled to the housing. The rotator rotates the housing based on the first instruction. In some implementations, the housing includes a first base, a plurality of holes in the first base, and a plurality of nozzle holders on the first base.

In some implementations, the second 3D printer includes a nozzle, a first axis slider associated with the nozzle, a holder for holding an object, and a rotator operable to rotate the holder in response to the second instruction. In some implementations, the nozzle is bent. In some implementations, the nozzle is curved.

DESCRIPTION OF DRAWINGS

Like reference symbols in the various drawings indicate like elements.

DETAILED DESCRIPTION

To overcome these challenges, a multi-nozzle multi-material method has been developed for extrusion-based 3D printing to address challenges found in functionally graded 3D printing.

Figure 1:
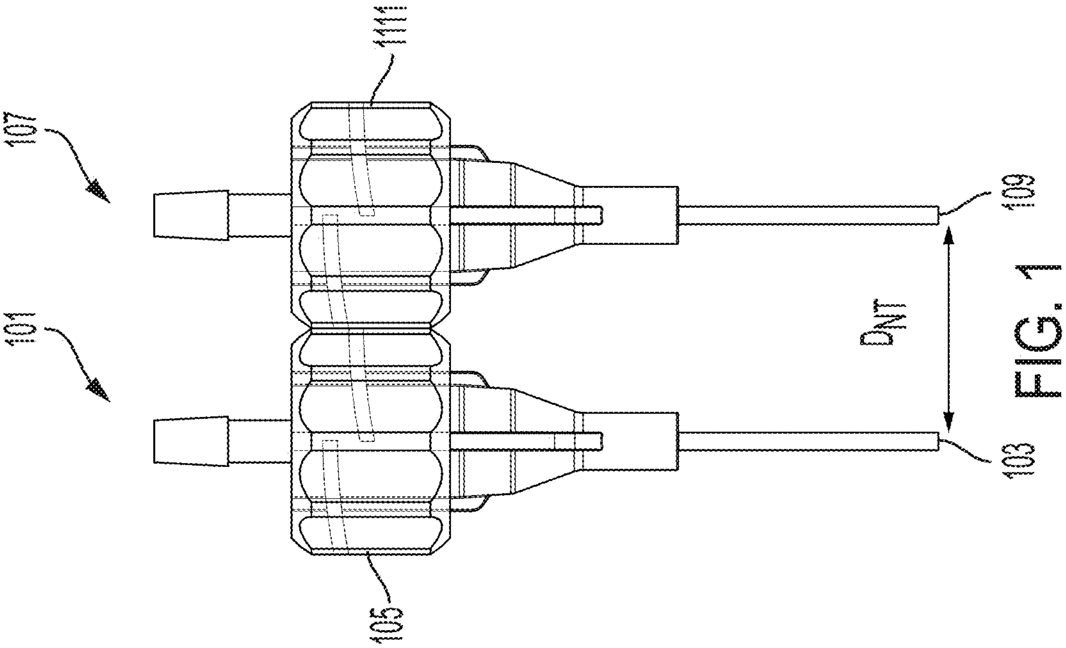
FIG. 1 shows a minimum distance between tips of two straight nozzles.

As shown in FIG. 1, two straight nozzles 101, 107, each with a nozzle tip 103, 109 and a hub 105, 111 featuring a luer lock, are positioned facing each other. The variable $D_{NT}$ represents the distance between the two nozzle tips 103, 109. As shown, the dimensions of the nozzles' hubs 105, 111 restrict how closely the nozzle tips 103, 109 can be positioned, as the tips 103, 109 are always separated by the size of the hubs 105, 111. To enhance the multi-nozzle configuration, the DNT between the nozzles' tips 103, 109 needs to be shorter.

Figure 2A:
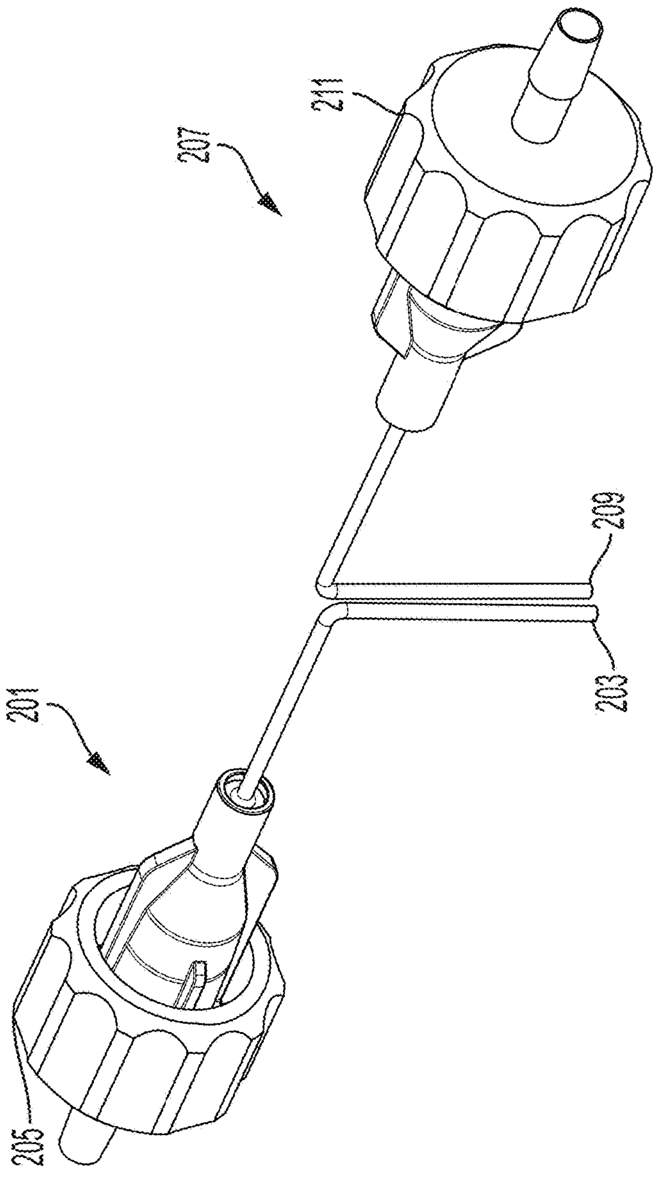
FIGS. 2A and 2B show that a distance between tips of two bent nozzles.
Figure 2B:
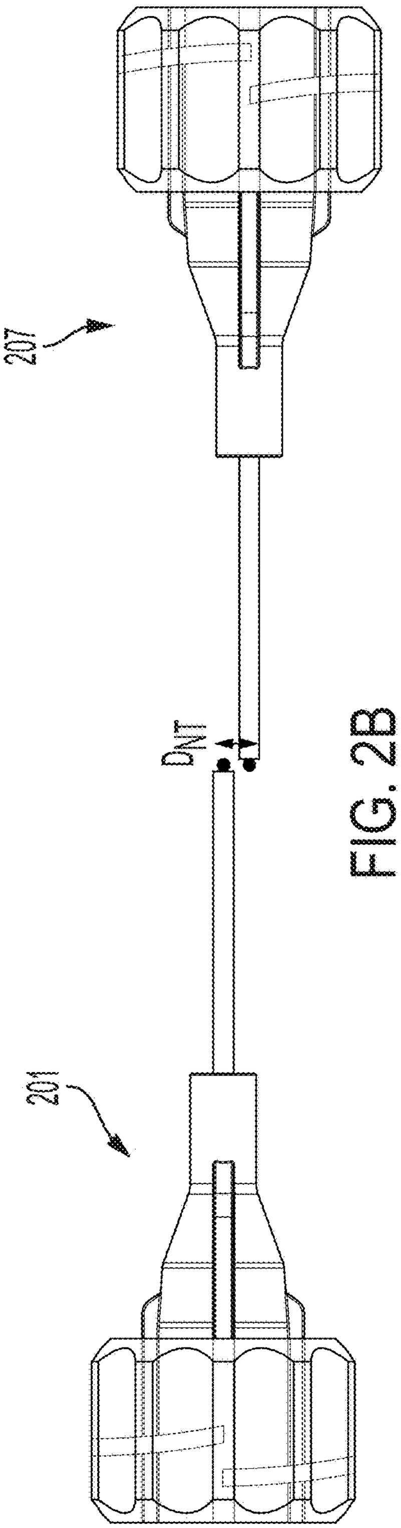

As will be explained in this disclosure, bent nozzles or curved nozzles are used in some implementations to position the nozzle tips as close together as possible, improving the multi-nozzle configuration. For example, as shown in FIGS. 2A and 2B, the nozzle tips 203, 209 of the bent nozzles 201, 207 extend at an angle from a straight nozzle portion extended from the nozzle hub 205, 2011 (e.g., at an angle of 90°), so that the nozzle tips 203, 209 are positioned very close to one another, while the nozzle hubs 205, 211 do not make contact. As shown, the $D_{NT}$ between the tips 203, 209 of the nozzles 201, 207 is much shorter than the distance $D_{NT}$ between tips 103, 109 of the nozzles 101, 107 in FIG. 1. It will be appreciated that other angle ranges may be used without departing from the disclosure. Pursuant to a further implementation, the bent nozzles may extend at a range of 5° to 175° relative to the straight nozzle portion. The cross-sectional shape of the nozzle tips 203, 209 is not limited to circular, but may also be triangular, quadrangular (e.g., square, rectangle), pentagonal, etc. without departing from the scope of the disclosure.

More nozzles with different bending angles ($1°<\theta<359°$) can be added to increase the number of nozzles. As the number of nozzles increases, the printing time is reduced. This can be applied to any different nozzle diameters. Moreover, with the multi nozzle configuration each nozzle can extrude a different material.

In some implementations, an extrusion system includes a plurality of bent nozzles (90 degrees). For example, the extrusion system can include 10 bent nozzles, each angled at 90 degrees. In some implementations, the extrusion system includes more than 10 bent nozzles, each angled at 90 degrees.

In some implementations, the extrusion system is mountable on a traditional cartesian based 3D printer frame with little calibration. For example, in some implementations, the extrusion system is mounted on an Ender Pro 3 3D printer frame from Creality. The traditional cartesian based 3D printer frame provides degrees of freedom in linear X, Y, and Z directions to the extrusion system.

As shown in FIG. 3A through FIG. 3D, in some implementations, an extrusion system 301 (also referred to as rotating extruder) includes two plates (a cover plate 302 and a base plate 303 in this example) that secure via luer locks the nozzles 311-320 in place. The base plate 303 may have multiple holes to accommodate the tips of nozzles 311-320 (also referred to as needles). The tips of nozzles 311-320 may be located centrally in a predefined pattern with the hubs radially outwards and spaced circumferentially along the plates. The holes provide openings so that the tips of nozzles 311-320 can be located close to the printing bed. Additionally, the base plate 303 can include a holding structure 331-340 (also referred to as nozzle slot) for each 90-degree bent nozzle 311-320 to keep the tips securely positioned within the holes.

In some implementations, each holding structure 331-340 features two open slots, allowing the nozzles 311-320 to be easily placed onto the holding structures 331-340. This configuration ensures the tips are aligned according to the pattern of holes on the base plate 303. In this example, the holes are arranged linearly (also referred to as straight-line configuration). The base plate 303 may also include coupling structures 351, 353 (e.g., two in this example) for attaching the base plate 303 to the cover plate 302. The base plate 303 may be also referred to as a housing or nozzle housing. The base plate 303 along with the cover plate 302 may be referred to as a housing or nozzle housing.

In some implementations, the extrusion system 301 includes a motor support base 361, a motor 363 mounted on the support base 361, and an attachment plate 365 connected to the support base 361. The attachment plate 365 secures the extrusion system 301 to the 3D printer frame (such as Ender Pro 3 3D printer frame from Creality), enabling X, Y, and Z movements of the nozzle tips 311-320.

In some implementations, the cover plate 302 is coupled to the rotating end 367 (also referred to as motor shaft) of the motor 363. As the motor 363 rotates (e.g., clockwise, counterclockwise, combination of clockwise and counter-clockwise), the cover plate 302 rotates accordingly, causing the tips of nozzle 311-320, positioned between the plates, to rotate. This configuration enables the motor 363 to provide rotational motion around the Z-axis.

Traditionally, direct ink writing printing involves degrees of freedom in linear X, Y, and Z directions (back-and-forth, up-and-down, and side-to-side movements). For instance, the printing bed of a 3D printer typically moves back and forth in linear Y in FIG. 4, while the extrusion head moves up and down in linear Z direction in FIG. 4 and side to side in X direction shown in FIG. 4. With the tips of the nozzles 311-320 configured to rotate using the motor (also referred to as rotary unit) 363 as shown in FIG. 3, rotational motion around the Z-axis is introduced in addition to the traditional linear movements.

The extruder 301, specifically using bent nozzles, offers the ability to print shapes with slow printing speeds and small nozzle diameters without compromising the desired high-resolution print while significantly reducing printing time by approximately 90% (proved experimentally). This combination of features provides a compelling advantage compared to other traditional options. By aligning the tips of the bent nozzles 311-320 in a straight-line configuration, the printed shapes are limited to a unidirectional pattern. However, with the rotating extruder design, it is now possible to achieve a two directional print control that utilizes the full potential of the extrusion system configured with muti nozzles. This allows more complex and varied shapes to be printed more precisely and accurately. Additionally, the rotating extruder (e.g., extruder 301 coupled with a traditional 3D printer frame) can print functionally graded materials by instantly modifying the distance between the printed lines, providing an even greater range of possibilities.

As shown in FIG. 3A through 3D, the simple design of the extrusion system model developed is cost-effective, both in terms of initial investment and ongoing maintenance, making it a favorable choice for high quality rapid mass manufacturing. Modifying the design to add, remove, or relocate the nozzles can be done quickly. Furthermore, replacing clogged nozzles, which is a common problem in direct ink writing, can be done easily.

Industries utilizing Direct Ink Writing (DIW) as a 3D printing method can greatly benefit from this invention. These industries include, but are not limited to, energy storage, such as battery manufacturing; biomedical applications, enabling the printing of tissues and bones; and electronics, including flexible devices and sensors.

Tool path strategies in 3D printing are controlled by 3 axes (X-Y-Z cartesian plane). Adding a rotation to the tool path strategy can enhance tool path optimization by achieving complex shapes utilizing an axis rotation instead of movement in the cartesian plane. The patterns can be used to enhance infill design which directly controls the structural integrity of the part, as well as the surface finish and overall performance of the part.

The rotating extruder 301 offers several overall benefits, including the ability to print multiple materials simultaneously, ensuring multi-material printing without contamination. It features a multi-nozzle configuration for time efficiency, a low-cost design, and flexibility with customizable options. Additionally, maintenance is low-cost and straightforward.

Simultaneous 3D printing offers numerous advantages. It enables advanced material combinations by printing different materials at the same time, allowing the creation of composite materials or material gradients in real-time. This capability optimizes the mechanical, thermal, or electrical properties of the final object and fosters innovation in material science through experimentation with novel combinations.

Seamless material integration is another benefit, as materials printed simultaneously bond more effectively at the point of deposition, resulting in stronger and more cohesive structures compared to those assembled post-process. Additionally, this technology allows for the fabrication of complex internal structures, including intricate support systems, internal channels, or gradient material distributions, which are often unachievable with traditional methods.

Simultaneous multi-material printing also supports in-situ functionalization by integrating functional elements, such as sensors or electronic circuits, directly into parts. This facilitates the creation of functional prototypes or finished components in a single step. Enhanced design flexibility gives designers the freedom to explore material combinations and innovative structures without the constraints of post-print assembly.

This capability further supports on-demand manufacturing, enabling the rapid production of customized parts tailored to specific needs. In bioprinting, it enables the creation of complex biological structures by precisely placing different cell types or biomaterials to mimic natural tissues, unlocking new possibilities in regenerative medicine and tissue engineering.

Simultaneous multi-material 3D printing thus represents a significant advancement in additive manufacturing technology, offering remarkable opportunities for innovation in design and fabrication across various industries. This rotating extruder allows for a level of customization, efficiency, and material complexity that is challenging to achieve through other manufacturing methods.

Multi-material printing offers significant benefits. It enables functionally graded printing, where material properties transition seamlessly within a single part. This capability enhances mechanical properties by allowing the use of different materials in specific areas to provide strength, flexibility, or impact resistance—for example, incorporating rigid sections for structural support alongside flexible joints in one print.

Additionally, it supports integrated functionality by embedding electronic components, sensors, or other functional elements directly into the printed parts. Multi-material printing also allows for tailoring thermal and electrical properties, enabling the creation of parts with specific characteristics suited for applications such as heat exchangers or custom electronic enclosures.

The selection of nozzle diameter in a 3D printing setup depends on several factors, each contributing to performance and print quality. Material properties, such as viscosity and particle size, influence the choice. High-viscosity materials often require larger nozzles, although some shear-thinning materials can work with smaller nozzles. Similarly, the particle size of the material must align with the nozzle diameter, as larger particles can clog smaller nozzles.

Printing accuracy and path complexity also affect nozzle diameter selection. Smaller nozzles are suitable for applications requiring high precision and intricate details, though they may result in longer print times. Such nozzles are also more effective at handling complex paths, improving the precision of the print.

Printing resolution, which reflects the quality of the final product, is typically enhanced by using smaller nozzles, allowing for finer details.

Printing speed and flow rate are also important considerations. Faster printing speeds require higher flow rates, which larger nozzles can handle more effectively. However, extrusion pressure differs between nozzle sizes, with smaller nozzles requiring higher pressure than larger ones.

In a multi-nozzle arrangement, varying nozzle diameters (e.g., nozzle tips with different diameters) can be strategically used to balance precision, speed, and material compatibility, optimizing overall performance.

Certain specialized applications have unique requirements when selecting nozzle diameters. For example, biomedical applications and tissue engineering often require small nozzle diameters. The extruded filament's size must align with cell sizes to ensure cell viability and proper nutrient flow. Similarly, lithium-ion battery electrode fabrication involves composite inks containing active materials, conductive additives, and binders. The nozzle diameter must be large enough to prevent clogging by these composite particles while still being small enough to maintain precision for achieving the desired porosity and microstructure in the electrode layers. These factors are critical when determining the most suitable nozzle diameter, as they balance precision, speed, material properties, and application-specific needs.

Figures 3A, 3B, 3C, 3D:
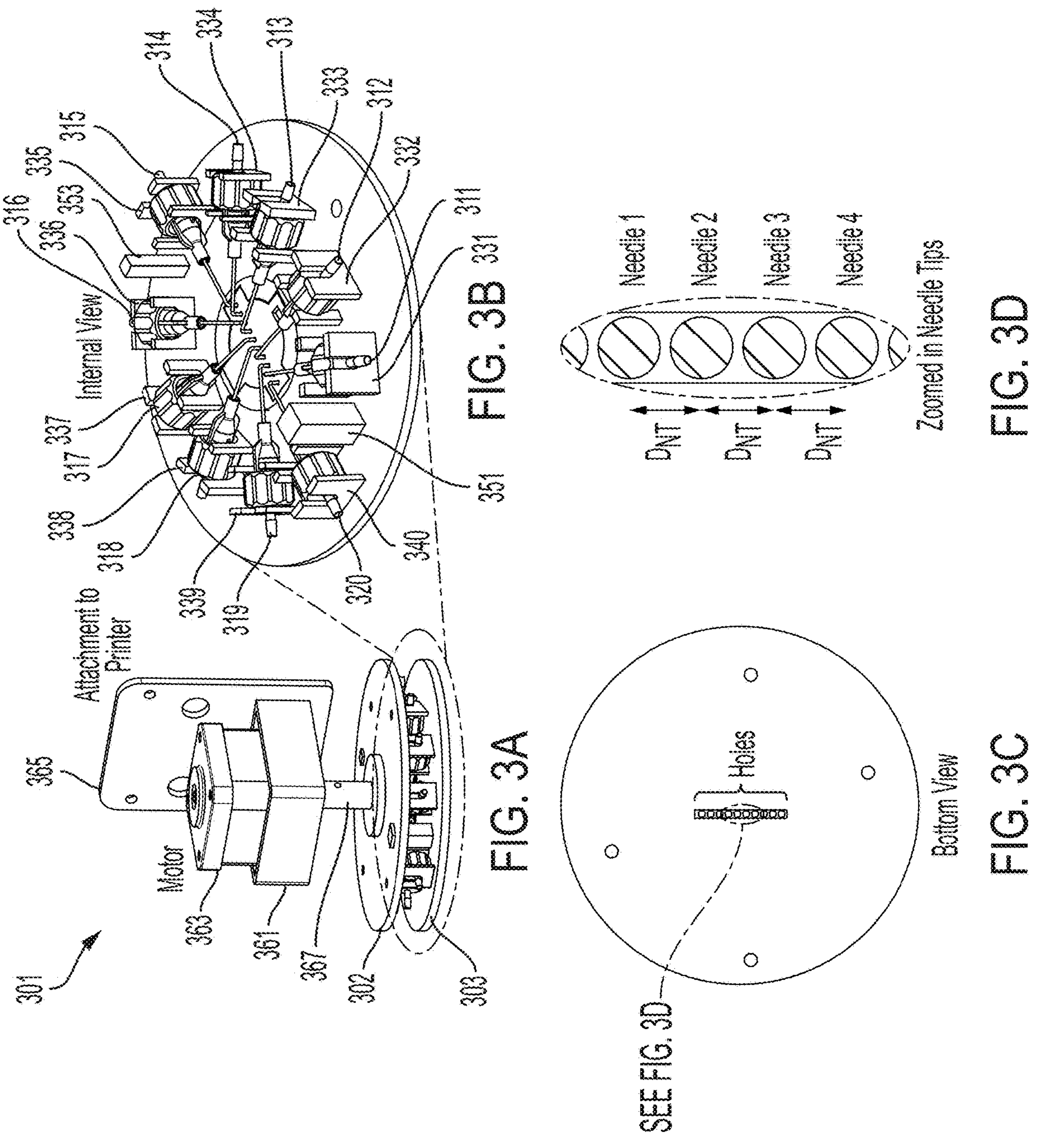
FIG. 3A through FIG. 3D show an extruder in accordance with some implementations of the disclosure.
Figure 4:
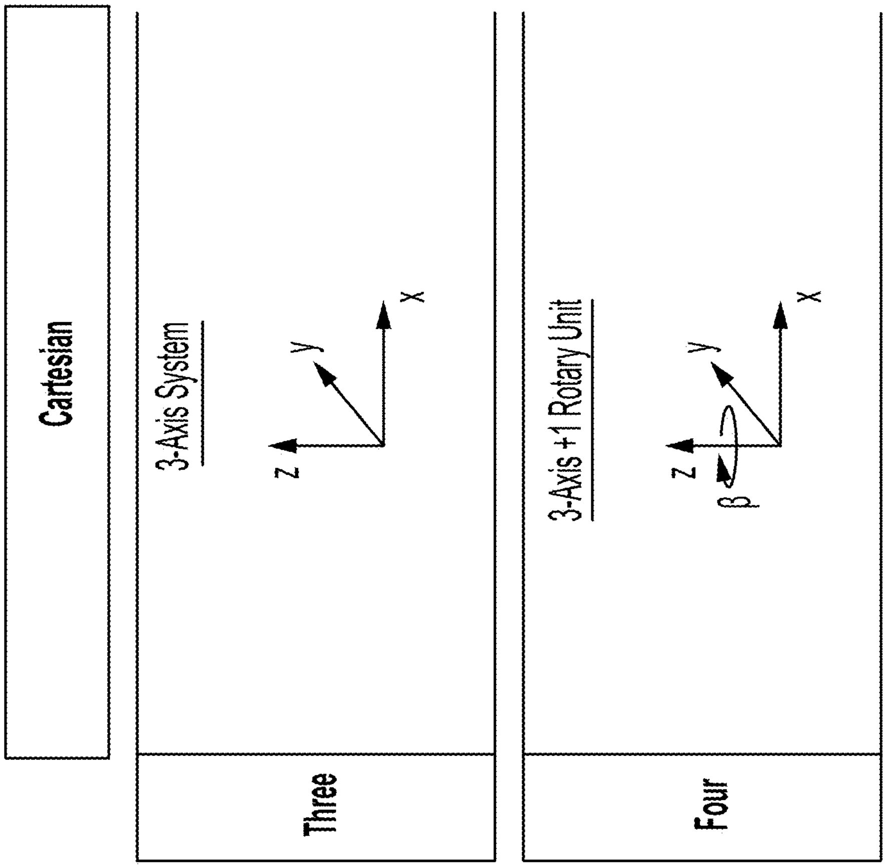
FIG. 4 shows movements of an extruder in accordance with some implementations of the disclosure.

Varying the diameter in a multi-nozzle arrangement as shown in FIG. 3A through FIG. 3D provides several advantages that improve both versatility and efficiency in the printing process. Multi-material compatibility allows different nozzle diameters to be used for different materials depending on their properties and application requirements. The extruder 301 configured with multi-nozzle as shown in FIG. 3B can accommodate these varying needs while enabling the simultaneous printing of diverse materials.

Precision control is another benefit, achieved by using larger diameter nozzles for less detail-oriented areas of a print and smaller nozzles for areas that require high accuracy. This approach ensures both efficiency and precision throughout the print. Printing time efficiency is improved by using larger nozzles to extrude more material at once in areas that do not demand fine detail, significantly reducing the overall printing time.

Customizable layer thickness is influenced directly by the nozzle (tip) diameter. Smaller nozzles create thinner layers, which are important for factors like heat transfer during printing. Thinner layers increase surface contact among filaments, leading to improved heat transport mechanisms and better cohesion. Enhanced surface quality can also be achieved by using smaller nozzles on the outer layers, creating smoother surface finishes, which are particularly beneficial for the aesthetic quality of the final product.

Selecting the appropriate nozzle diameter requires careful consideration of material properties, application needs, and compatibility with the printing equipment. In multi-nozzle systems, the ability to vary nozzle diameters offers numerous benefits such as customization, optimized flow rates, precise spatial control, and overall improved efficiency in the 3D printing process.

Figure 5:
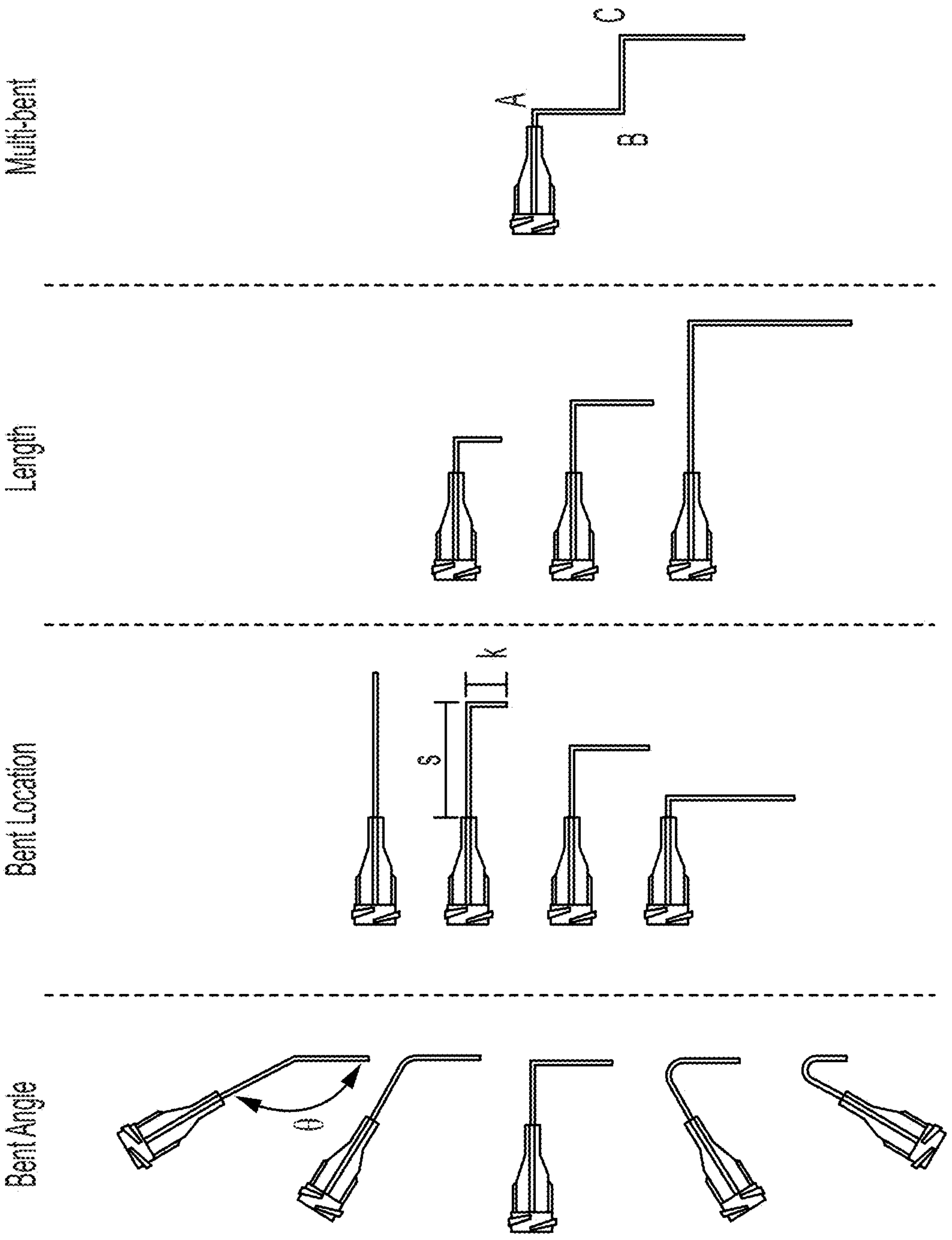
FIG. 5 and FIG. 6 show various vent nozzles with variations in accordance with some implementations of the disclosure.
Figure 6:
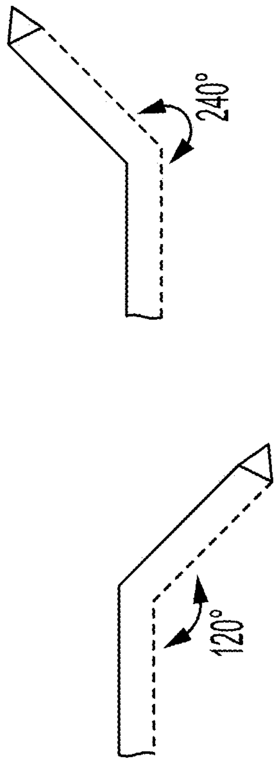

In this disclosure, the nozzles can have many variations. Using bent or curved nozzles, several parameters can be customized to achieve the nozzles arrangements. FIG. 5 shows some of the parameters starting with the bending angle. The nozzle can have a bent angle θ where $1<\theta<359$. The angle may be taken relative to the tip and the straight nozzle portion extending from the hub. The range of angles at which nozzles can be bent is adaptable for both symmetrical and non-symmetrical shapes. For instance, bending a triangular-shaped nozzle by 120° results in a different orientation compared to bending it by 240°. This difference arises because the bend could occur along one of the triangle's faces or along one of its edges. This concept is visually demonstrated in FIG. 6. Also, the bend location plays an important role in optimizing the use of bent nozzle. By fixing the nozzle length, it is possible to vary the bend location where the distances S and K are the distances of the nozzle before and after the bend, respectively. The nozzle length is another important parameter. By fixing the bend angle and location, it is possible to arrange nozzles with different lengths in various ways. To extend the nozzle arrangement further, it possible to have a multi-bent nozzle where the nozzle has more than one bent. As shown in FIG. 5. The multi-bent nozzle has three bents (A, B, and C) where the distance between the bends, angle of each bent, number of bends can vary, and the total length of the nozzle can vary. For the multi-bend case, the number of bends N is large than 1.

As a results, the extruder 301 can accommodates any of the following parameters to have a large array of nozzles: bend angle, bend location, length of the nozzle, and multi-bend nozzle.

Figure 7:
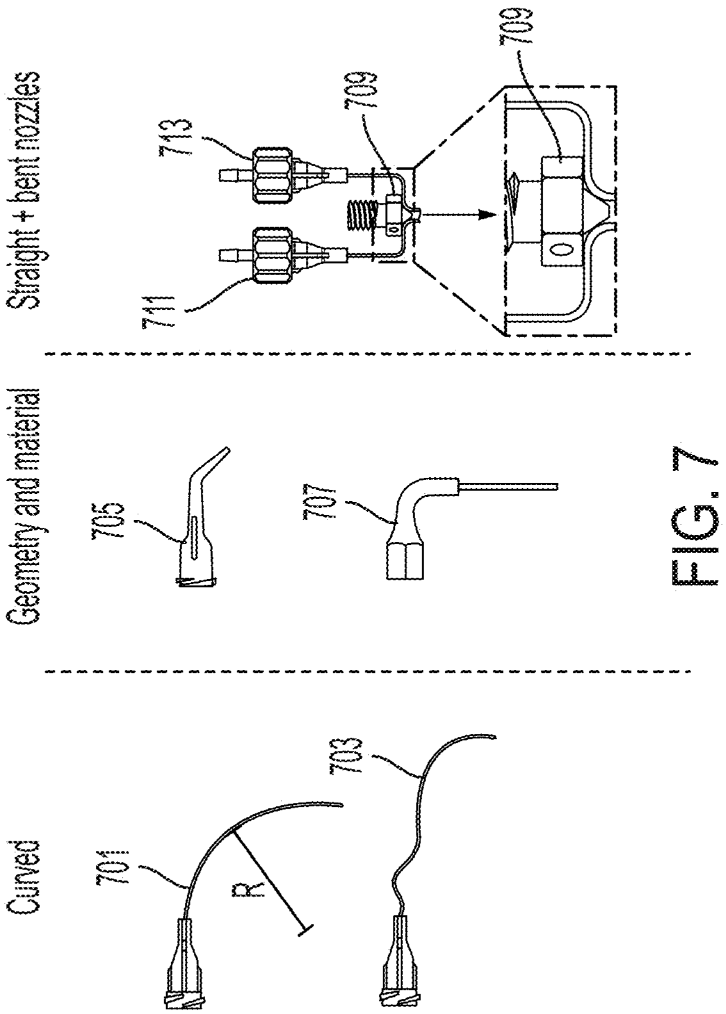
FIG. 7 shows show various vent nozzles with variations in accordance with some implementations of the disclosure.

Moreover, the extruder 301 can accommodates another set of parameters that can be manipulated to have various nozzles. The first one, is the curved nozzles 701, 703 as shown in FIG. 7. Although curved nozzles (such as nozzle 701 with a single curve and nozzle 703 with a multiple curves) are similar to bent nozzles such as bent nozzles in FIG. 5, it is difficult to measure the bending angle; instead, the curve radius R is used to determine the curve shape. Curved nozzles can be used similar to the bent nozzles where the tips can be arranged to be next to each other without the need of the nozzle's hubs to touch each other. This will also allow for multi-material simultaneous 3D printing. Furthermore, the curved nozzle can have more than one curve as shown with the curved nozzle 703. It is also possible to have one nozzle to be bent in some part and curved in another one to allow for flexible configurations.

The geometry of the nozzle and its material can also be varied. As illustrated in FIG. 7, the nozzle material can be plastic (e.g., nozzle 705), a metal such as steal (e.g., nozzle 707), or other materials or combination of materials depending on the applications. The extruded material can flow in some nozzles better than others. Also, some inks need to be heated before and during extrusion. The geometry of the nozzle can also vary as it is possible to have cylindrical, tapered, or other geometry of the nozzle. The applied pressure will differ between the nozzles with different geometries. Moreover, the nozzle diameter can be selected based on the ink and the application. Also, the shape of the nozzle's tip can be varied as well to be any shape such as square, circle, triangle, rectangle, and others. The same case is applicable to the shape of the nozzle base.

The bent or curved configurations can be applied in any axes in the cartesian, cylindrical, spherical coordinates, or rotate around them. This means, it is possible to have a nozzle with helix or spiral shapes.

Combining bent nozzles with straight nozzles does not include all nozzle to be similar in any way. As illustrated in FIG. 7, a straight regular 3D printer nozzle 709 that is made of brass is arranged with two bent nozzles 711, 713 for simultaneous multi-material 3D printing. This approach can be applied to any straight nozzle where bent or curved nozzles can be added to the arrangement.

In some implementations, at least one bent or curved nozzle is combined with another type of nozzle such as a straight nozzle, another bent nozzle, a curved nozzle. For example, the combinations may include a straight nozzle with a bent nozzle, a bent nozzle with another bent nozzle, a bent nozzle with a curved nozzle, a curved nozzle with a straight nozzle, and other possible configurations.

Nozzles Arrangements

Bent and curved nozzles can be arranged in various ways to do multi-material simultaneous 3D printing. In this disclosure, four arrangements, but the scope is not limited to these arrangements.

Arrangement 1: Vertically Stacked Layers

Figure 8:
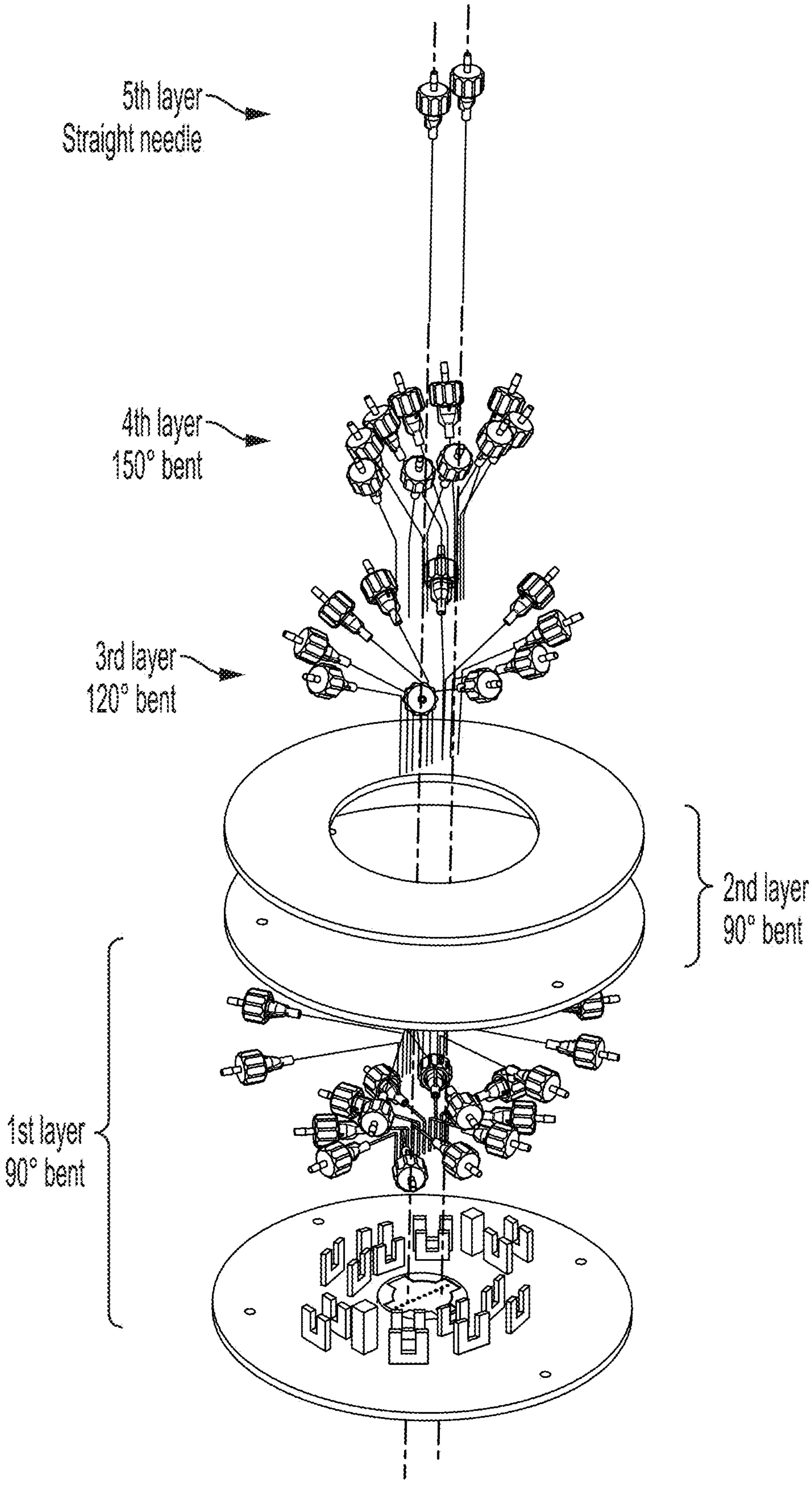
FIG. 8 through FIG. 13 show an extruder with vertically stacked layers in accordance with some implementations of the disclosure.

Bent nozzles or curved nozzles can be arranged in vertically stacked layers as shown in FIG. 8. The arrangement includes several layers that are stacked vertically where nozzles are placed in each layer. As a results, each layer (first layer, second layer, third layer, fourth layer, and fifth layer in this example) can have nozzles with the same or different parameters such as nozzle length, bent location, bent angle, and more. The tips of the nozzles are arranged to be very close to each other.

FIG. 8 shows an exploded view of the arrangement where nozzles with different bent angles are used in this arrangement but placed in different layers in accordance with some implementations of the present disclosure. The first and second layers include nozzles with 90° bent angles, while the third, fourth, and fifth layers include 120°, 150°, and straight nozzles, respectively. Further details about the nozzles in the first, second, third, fourth, and fifth layers are provided in FIG. 9 through FIG. 13.

Figure 9:
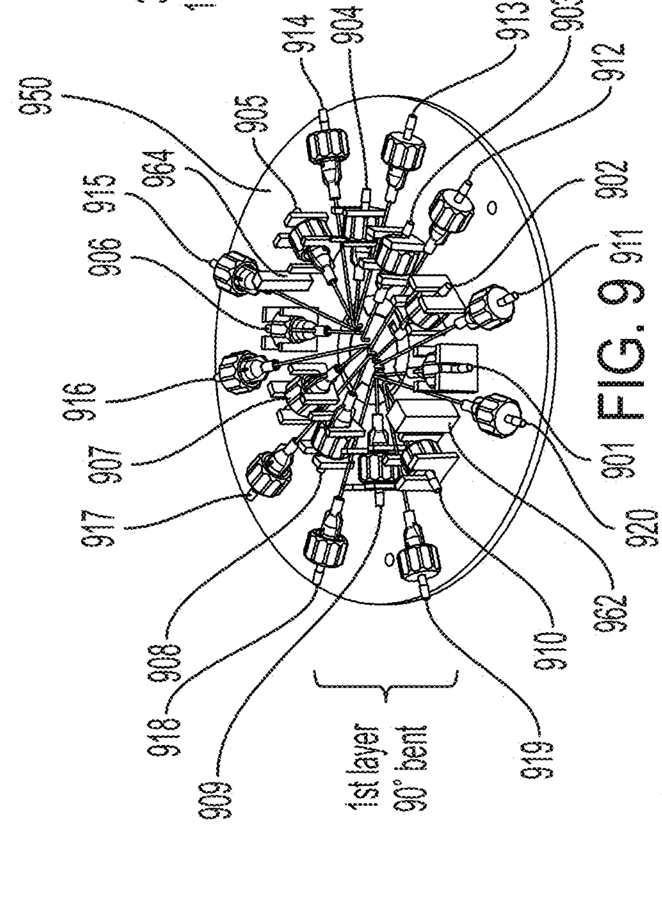

FIG. 9 illustrates the nozzles arrangement of the first layer shown in FIG. 8 in accordance with some implementations of the present disclosure. As shown, in some implementations, there are ten nozzles 901-910 form an inner circle and another ten nozzles 911-920 form an outer circle on a first base plate 950. In this context, the term "circle" may refer to a group. In this example, nozzles 901-920 associated with the inner circle and the outer circle are bent by 90°.

The first base plate 950 has a plurality of holes to accommodate the tips of nozzles 901-920. In this example, the holes accommodating the tips of nozzles 901-920 are arranged linearly (also referred to as straight-line configuration). In some implementations, the holes can be arranged in various linear and non-linear configurations. As shown, in some implementations, the first base plate 950 includes coupling structures 962, 964 (e.g., two in this example) for attaching the first base plate 950 to the cover plate (or another base plate that cover the base plate). In some implementations, the first base plate 950 have at least one coupling structure, such as a single coupling structure, two coupling structures, three coupling structures, or more. As shown, in some implementations, the first base plate 950 includes a holding structure for each bent nozzle (nozzles 901-910 in this example) to keep the tips securely positioned within the holes. As shown, in some implementations, each holding structure features two open slots, allowing the nozzles (nozzles 901-910 in this example) to be easily placed onto the holding structures. This configuration ensures the tips are aligned according to the pattern of holes on the base plate.

As shown, in some implementations, the nozzles 911-920 of the outer circle is securely on the base plate with corresponding holes without the holding structures. In some implementations, the nozzles 911-920 of the outer circle are securely on the base plate with corresponding holes along with corresponding holding structures similar to the holding structures for the nozzles 901-910 of the inner circle on the first base plate 950. Each nozzle 910-920 is in fluid communication with a different print material source.

As shown, in some implementations, the lengths of horizontal portions of the nozzles associated with the inner circle is shorter than the lengths of horizontal portions of the nozzles associated with the outer circle. In some implementations, the lengths of vertical portions of the nozzles associated with the inner circle are the same with the lengths of vertical portions of the nozzles associated with the outer circle. In this configuration, the vertical portions of the nozzles from both circles may protrude to the same length below the bottom surface of the base.

In some implementations, the lengths of the vertical portions of the nozzles (needle portions after 90° bent in this example) are arranged independently of whether the nozzle belongs to the inner or outer circle. For example, the lengths of the vertical portions may be determined based on the shape of the object being 3D printed. For instance, the lengths of the vertical portions may be determined based on the shape of the object being 3D printed or the surface to which the nozzles are printing. In this configuration, the vertical portions of the nozzles from both circles may extend to varying lengths below the bottom surface of the first base plate 950.

Figure 10:
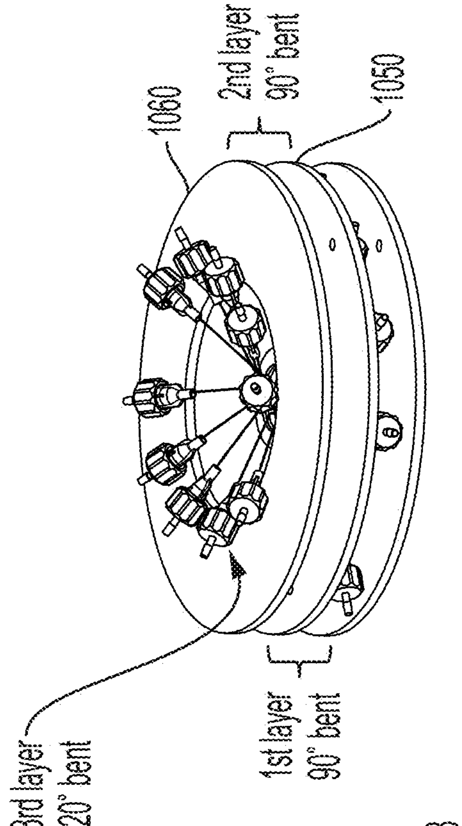

FIG. 10 illustrates the second layer 9 shown in FIG. 8 in accordance with some implementations of the present disclosure. Although the second layer appears empty in FIG. 10, in some implementations, the nozzles 911-920 associated with the outer circle in the first layer may be installed on a second base plate 1050 (configured with an oping in the center) that covers the first base plate 950. In such cases, the vertical portions of the nozzles are longer due to the height difference between the first and second layers. Each nozzle is in fluid communication with a different print material source.

FIG. 10 further illustrates the third layer shown in FIG. 8 in accordance with some implementations of the present disclosure. For the third layer, nozzles with angle greater than 90° degrees are used as shown in FIG. 10. In this example, ten nozzles with 120° degrees bent are used for the third layer. As shown, in some implementations, a third base plate 1060 is disposed above the first base plate 950 and the second base plate 1050 and provide an access opening for the ten nozzles with 120° degrees bent. Each nozzle is in fluid communication with a different print material source.

Figure 11:
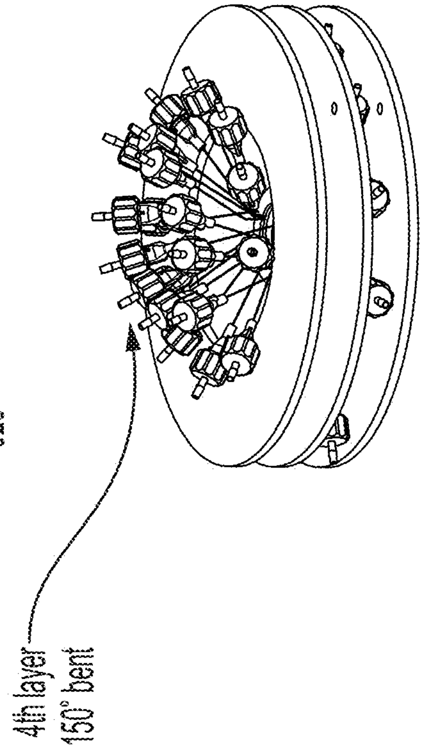

FIG. 11 illustrates the fourth layer shown in FIG. 8 in accordance with some implementations of the present disclosure. For the fourth layer, nozzles with angle greater than 120° degrees are used as shown in FIG. 11. In this example, ten nozzles with 150° degrees bent are used for the third layer. Each nozzle is in fluid communication with a different print material source.

Figure 12:
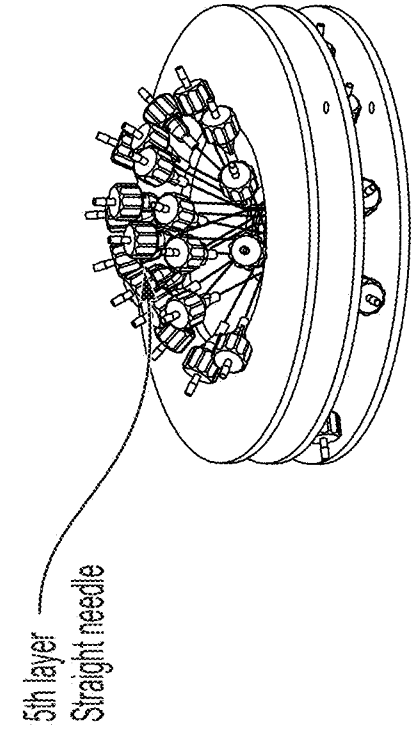

FIG. 12 illustrates the nozzle arrayment of the fifth layer which has straight nozzles (two straight nozzles in this example) that are placed vertically in the arrangement.

Figure 13:
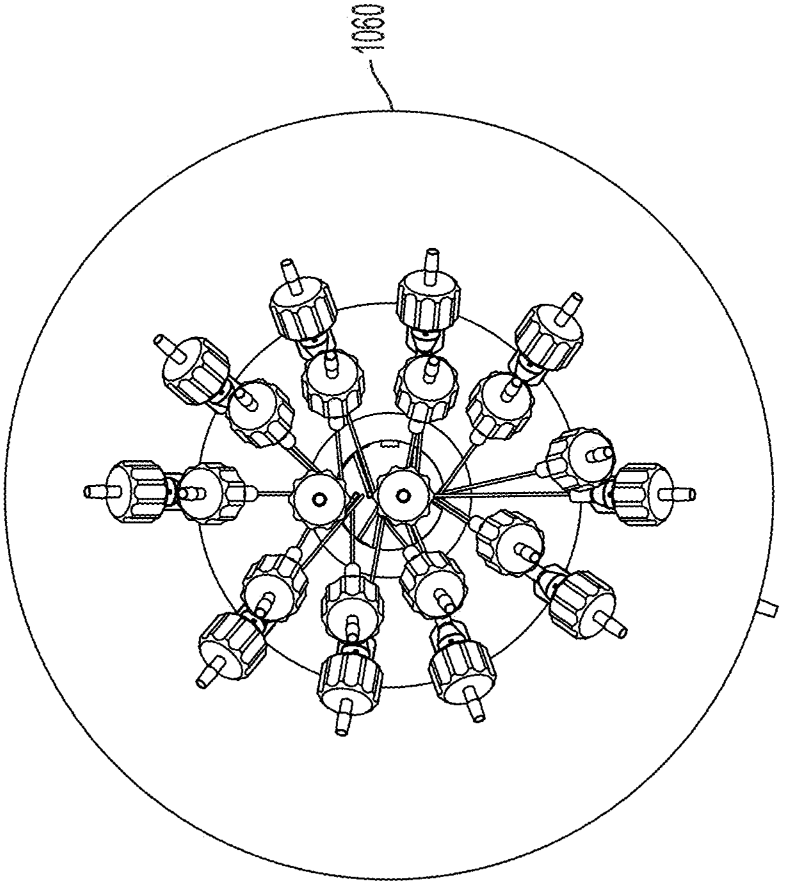

FIG. 13 presents a top view of the nozzle arrangement depicted in FIG. 8, illustrating the vertically stacked layers. This vertically stacked configuration represents just one example of how the nozzles can be organized. Numerous other arrangements are possible by utilizing the nozzle variation parameters discussed earlier. Each nozzle is in fluid communication with a different print material source, allowing for versatile and efficient material delivery during the printing process.

Arrangement 2: Semi-Spherical Arrangement

Figure 14:
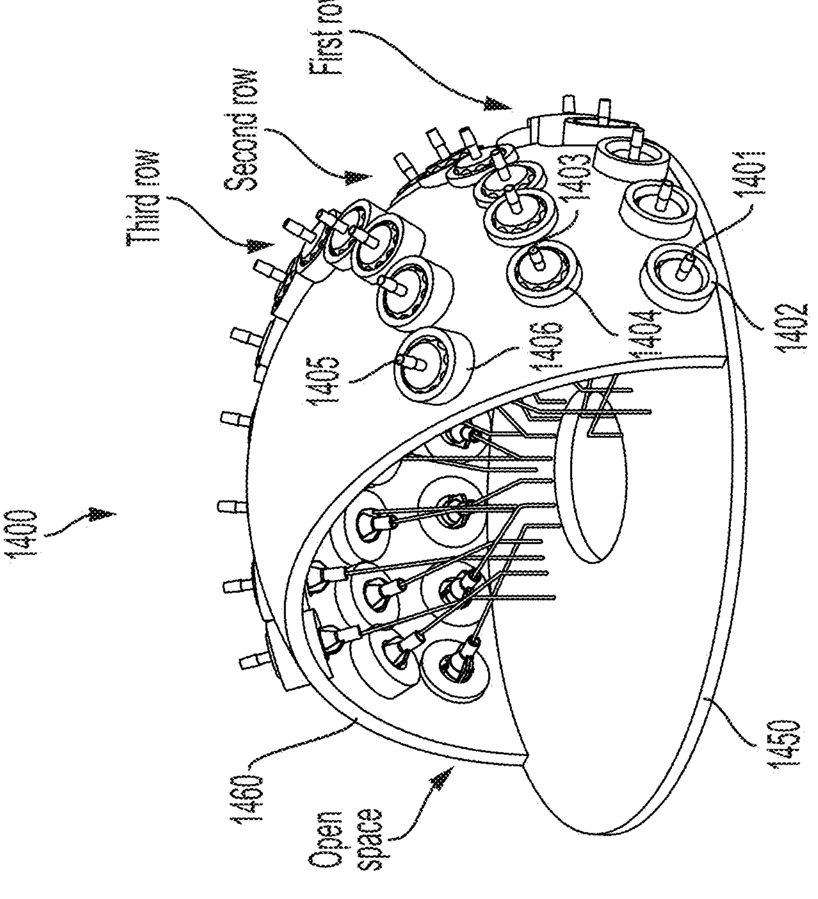
FIG. 14 and FIG. 15 show a semi-spherical extruder in accordance with some implementations of the disclosure.
Figure 15:
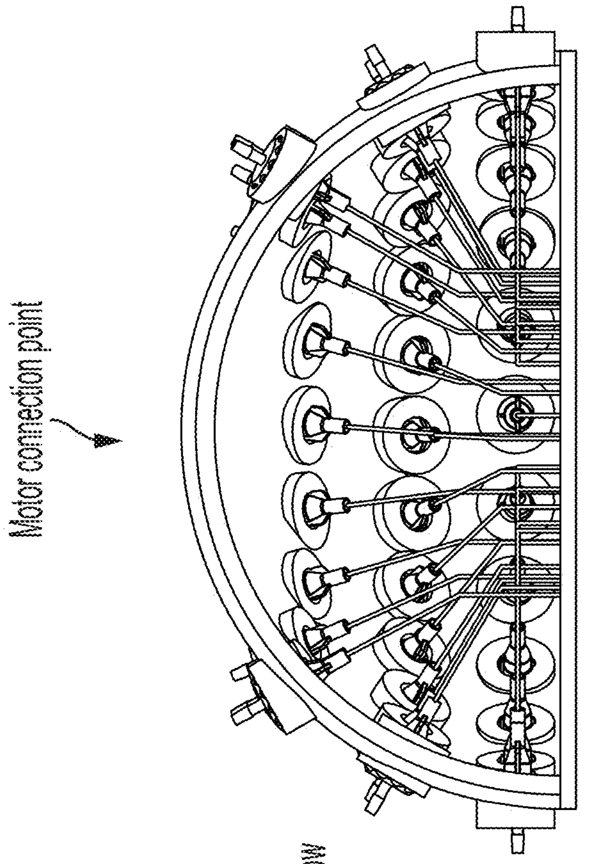

FIG. 14 and FIG. 15 show a semi-spherical extruder 1400 configured with bent or curved nozzles. As shown, nozzles with different bent angle can be arranged to form the nozzle tip arrangement.

As shown, in some implementations, nozzles are arranged on the semi-spherical shape cover 1460 on a base plate 1450. In some implementations, a single row of nozzles surrounds the semi-spherical cover 1460. In some implementations, multiple rows of nozzles are arranged around the semi-spherical cover 1460. In this example, there are three rows of nozzles 1401, 1403, 1405 surrounding the semi-spherical cover 1460.

As illustrated, in some implementations, a first row of nozzles 1401 is positioned on the lower portion of the semi-spherical cover 1460, a second row of nozzles 1403 on the middle portion, and a third row of nozzles 1405 on the upper portion of the semi-spherical cover 1460.

As illustrated, each nozzle 1401, 1403, 1405 is mounted on the semi-spherical cover 1460 through a nozzle slot 1402, 1404, 1406. To install the three rows of nozzles, the semi-spherical cover includes three corresponding rows of nozzle slots 1402, 1404, 1406. Each nozzle slot 1402, 1404, 1406 is cylindrical, featuring an outer opening and an inner opening, with the outer opening having a larger diameter than the inner opening. This design ensures that each nozzle slot 1402, 1404, 1406 securely holds its respective nozzle 1401, 1403, 1405.

As shown, in some implementations, the nozzle slots 1402 of the first row are configured to hold nozzles 1401 with 90° bend angles, the nozzle slots 1404 of the second row are configured to hold nozzles 1403 with 120° bend angles, and the nozzle slots 1406 of the third row are configured to hold nozzles 1405 with 150° bend angles.

As illustrated, in some implementations, the base plate 1450 is equipped with a plurality of holes, each carefully designed to securely accommodate the tip of its respective nozzle. Further, the holes allow the tips of nozzles to print on the printing bed. For example, the size of each hole is specifically matched to the size of the nozzle it holds, ensuring a snug and precise fit. Additionally, the shape of each hole corresponds to the shape of the nozzle tip, further enhancing stability. These design considerations prevent movement or vibration of the nozzle tips during the printing process, which is beneficial for maintaining accuracy and ensuring high-quality results. By securely anchoring the nozzle tips, the base plate contributes to the overall stability and reliability of the 3D printing system.

As illustrated, in some implementations, the semi-spherical cover is designed with an open space. This open space serves multiple purposes. First, it provides convenient access for configuring and positioning the nozzles according to the semi-spherical arrangement. The open design makes it easier to adjust or replace nozzles as needed, ensuring proper alignment and functionality during setup. Additionally, the partially open space is highly advantageous when addressing operational issues, such as troubleshooting clogged nozzles. By allowing direct access to the nozzles without disassembling the entire cover, this design simplifies maintenance and reduces downtime, thereby enhancing the overall efficiency and usability of the 3D printing system.

As illustrated, the semi-spherical arrangement is advantageous for accommodating a large number of nozzles within a confined space. This design maximizes the use of available area, enabling efficient nozzle placement while maintaining a compact overall structure.

In some implementations, the top portion of the semi-spherical cover 1460 ("motor connection point") is connected to the rotating end of the motor (e.g., rotating shaft 367 shown in FIG. 3A). As a result, similar to the extruder 301 illustrated in FIG. 3, the semi-spherical extruder 1400 can rotate when the semi-spherical cover 1460 is coupled to a traditional 3D printer frame. Additionally, guided by the movement of the 3D printer frame, the extruder 1400 with the semi-spherical arrangement can move along the X-direction and Y-direction during the printing process, enabling precise control and flexibility in nozzle positioning.

Arrangement 3: Spherical Arrangement

By expanding the semi-spherical arrangement to be spherical arrangement it is possible to have an extruder with more nozzles in a confined space.

Figure 17:
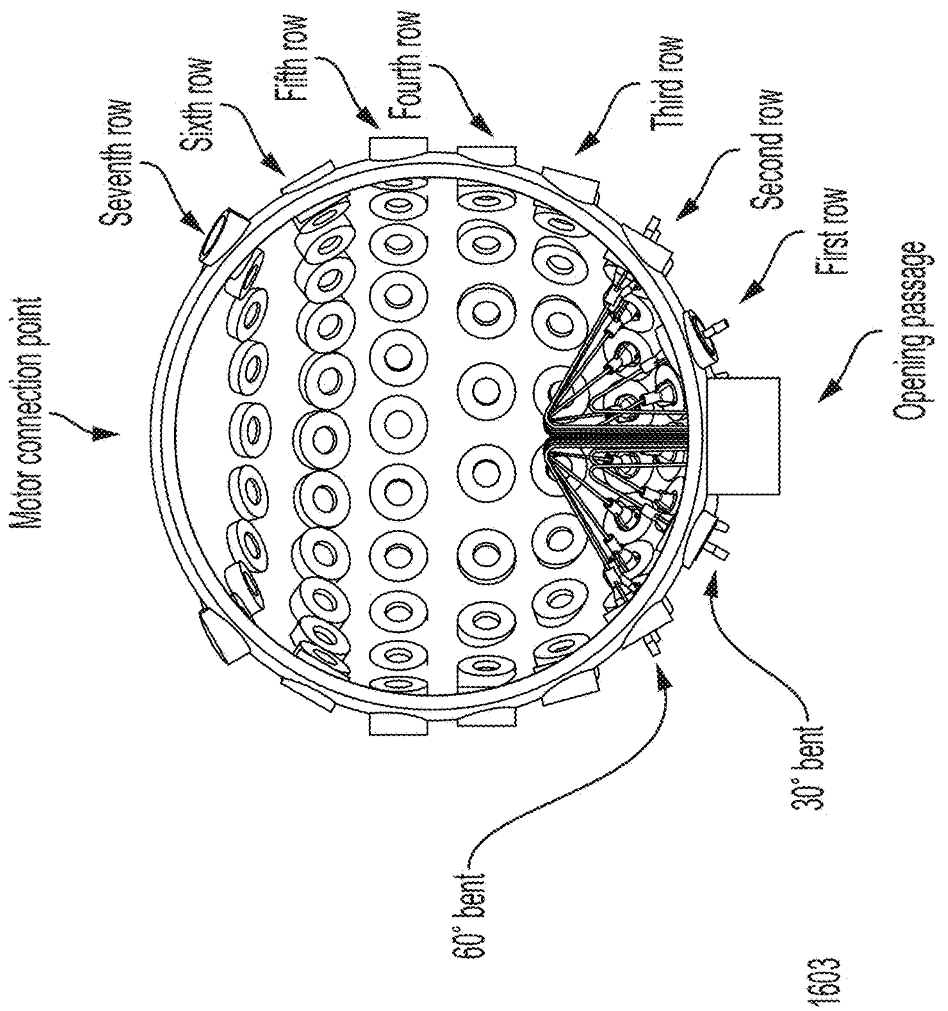
FIG. 16 and FIG. 17 show a spherical extruder in accordance with some implementations of the present disclosure.
Figure 16:
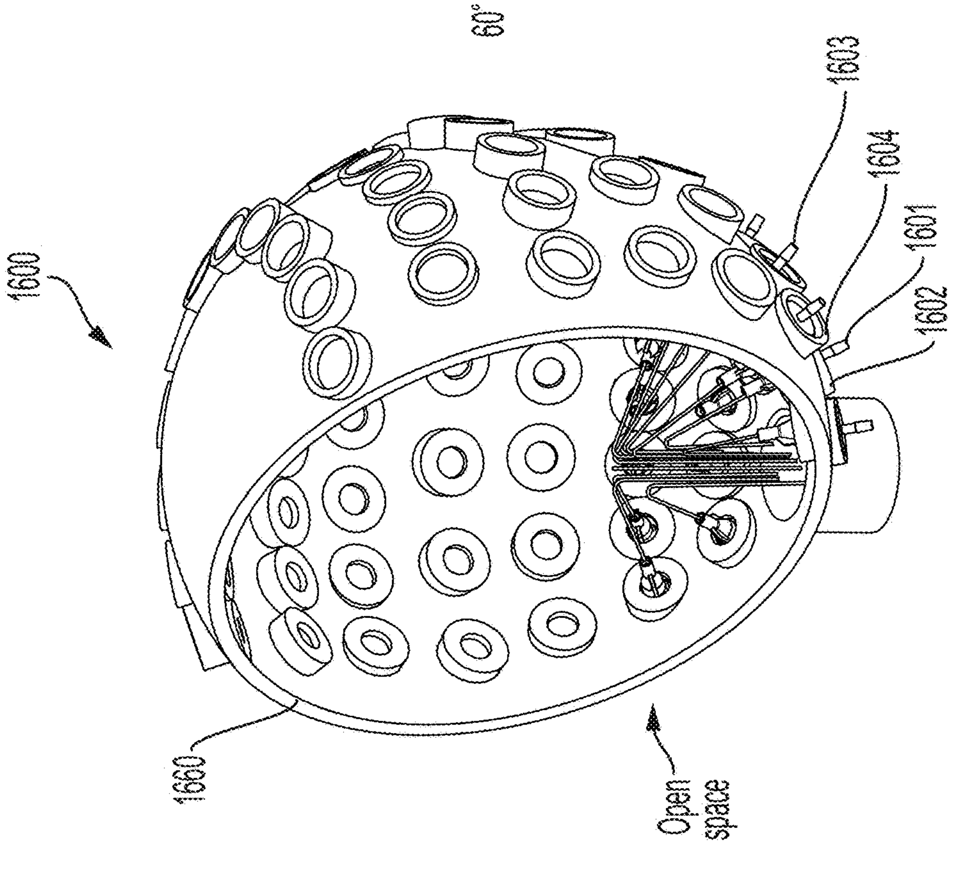

FIGS. 16, and 17 show a spherical extruder 1600 configured with nozzles that are bent in different angels (e.g., nozzle with angle less than) 90° in accordance with some implementations of the present disclosure. Nozzles 1601, 1603 with bend angles that are less than 90° are useful in this arrangement as the surface area of the sphere become smaller at the bottom of the sphere which limit the number of nozzles that can be held. As shown, nozzles 1603 with bend angles of 60° and nozzles 1601 with bend angles of 30° are configured with the spherical extruder 1600 in this example.

As shown, in some implementations, nozzles are arranged on the spherical cover 1660. In some implementations, a single row of nozzles surrounds the spherical cover 1660. In some implementations, multiple rows of nozzle are arranged around the spherical cover 1660. In this example, there are two rows of nozzles 1601, 1603 surrounding the spherical cover 1660.

As illustrated, in some implementations, the spherical cover 1660 includes multiple rows of nozzles. A first row of nozzles is positioned on the lower portion of the spherical cover, while a second row is located above the first row. A third row of nozzles is positioned above the second row, followed by a fourth row located above the third row. Additionally, a fifth row of nozzles is situated above the fourth row, with a sixth row located above the fifth row. Finally, a seventh row of nozzles is positioned above the sixth row. This multi-row arrangement allows for the strategic placement of nozzles, optimizing their coverage and accessibility during the 3D printing process. In this example, there are two rows of nozzles 1601, 1603 configured with the spherical extruder 1600.

As illustrated, each nozzle is mounted on the spherical cover through a nozzle slot. To install the seven rows of nozzles, the spherical cover includes seven corresponding rows of nozzle slots. Each nozzle slot is cylindrical, featuring an outer opening and an inner opening, with the outer opening having a larger diameter than the inner opening. This design ensures that each nozzle slot securely holds its respective nozzle.

As shown, in some implementations, the nozzle slots 1602 of the first row are configured to hold nozzles 1601 with 30° bend angles, the nozzle slots 1604 of the second row are configured to hold nozzles 1603 with 60° bend angles.

As shown, in some implementations, the spherical cover 1660 is designed with an opening passage located at the bottom of the spherical extruder 1600. This opening passage allows the tips of the nozzles 1601, 1603 to pass through and extend into the designated printing area (also referred to as printing bed). The passage is strategically positioned to ensure proper alignment and accessibility for the nozzles during the printing process. This design not only facilitates the smooth operation of the nozzles but also allows for efficient material flow while maintaining the structural integrity of the spherical cover 1660. The opening ensures that the nozzles can effectively interact with the printing surface, enabling accurate and reliable 3D printing.

As illustrated, in some implementations, the spherical 1660 cover is designed with a partially open space. This open space serves multiple purposes. First, it provides convenient access for configuring and positioning the nozzles according to the spherical arrangement. The open design makes it easier to adjust or replace nozzles as needed, ensuring proper alignment and functionality during setup. Additionally, the partially open space is highly advantageous when addressing operational issues, such as troubleshooting clogged nozzles. By allowing direct access to the nozzles without disassembling the entire cover, this design simplifies maintenance and reduces downtime, thereby enhancing the overall efficiency and usability of the 3D printing system.

As illustrated, the spherical arrangement is advantageous for accommodating a large number of nozzles within a confined space. This design maximizes the use of available area, enabling efficient nozzle placement while maintaining a compact overall structure.

In some implementations, the top portion of the spherical cover 1660 ("motor connection point") is connected to the rotating end of the motor (e.g., rotating shaft 367 shown in FIG. 3. As a result, similar to the extruder 301 depicted in FIG. 3, the spherical extruder 1600 can rotate when the spherical cover 1660 is coupled to a traditional 3D printer frame. Additionally, guided by the movement of the 3D printer frame, the extruder 1600 with the spherical arrangement can move along the X-direction and Y-direction during the printing process, enabling precise control and flexibility in nozzle positioning.

Arrangement 4: Other Arrangements

Other arrangements for an extruder can be considered where an array of bent, curved, and straight nozzles can be included. The arrangements can be as contained in simple shapes such as a cube, cylinder, sphere or in complex shapes such as irregular object or stacked arrangements. Simply, the nozzles can be attached to flat or non-flat surfaces.

Figure 18:
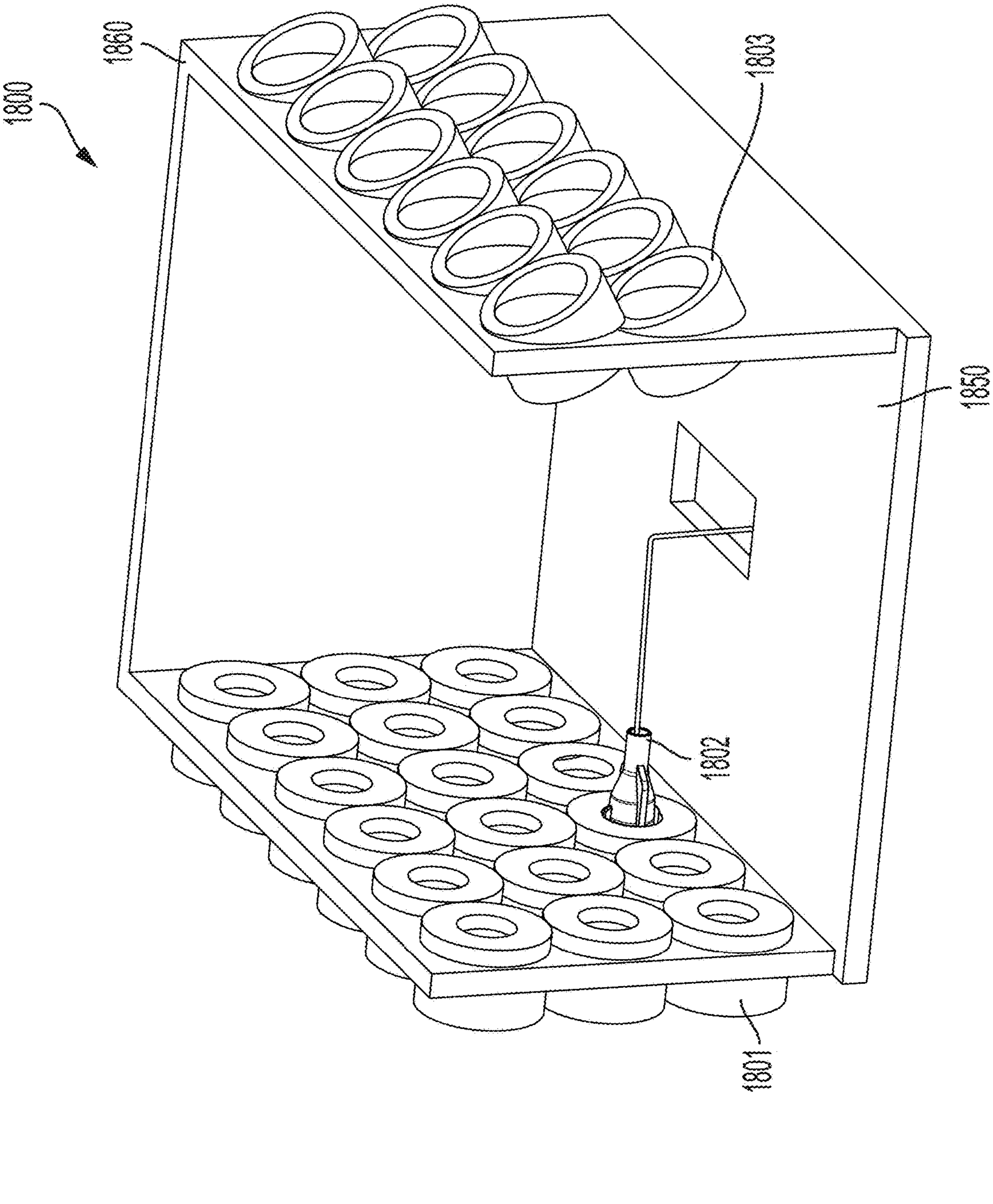
FIG. 18 shows a box-like shape extruder in accordance with some implements of the disclosure.

FIG. 18 shows a box-like shape extruder 1800 arranged with nozzles arrangement in accordance with some implements of the disclosure.

In some implementations, nozzles are arranged on the cover 1860 of a box-like structure, which features a base plate 1850 with an opening at the center. To provide a clearer view of the nozzle arrangement, the top side of the cover is not illustrated here. On one side of the cover 1860 (the left side in this example), there are one or more rows of nozzle slots, with three rows shown in this instance. On the other side of the cover (the right side in this example), there are one or more rows of angled nozzle slots, with two rows shown in this instance. Each nozzle slot is cylindrical and includes an outer opening and an inner opening. The outer opening has a larger diameter than the inner opening, ensuring that each nozzle slot securely holds its corresponding nozzle.

In these implementations, the nozzle slots 1801 on the left side of the box-like structure are configured to hold nozzles 1802 with 90° bend angles, while the angled slots 1803 on the right side are configured to hold nozzles with non −90° bend angles.

As shown, in some implementations, the base plate includes the opening. The opening allows the nozzle tips to reach the printing bed.

The present disclosure encompasses the use of materials, or combinations of materials, that may be suitable for 3D printing with a multi-nozzle arrangement but are not typically feasible with conventional single-nozzle systems. In some implementations, the disclosed system supports the deposition of a two-component material set, such as an epoxy resin and hardener. In other embodiments, the system is configured to accommodate arrangements involving three or more different types of materials. These combinations may include, for example, various polymers, fillers, or other material types, enabling enhanced flexibility and functionality in 3D printing applications.

The disclosed system and methods enable a wide range of advanced manufacturing applications. These include the fabrication of hybrid structures such as shape memory polymers and artificial muscles, as well as bioprinting processes for embedding tissues and living cells. Additionally, the system supports the production of battery components, including cathodes, anodes, and electrodes, and the creation of embedded flexible circuits with adjustable resistivity. It further allows for functionally graded 3D printing, and the printing of support materials and soluble materials for complex geometries and enhanced post-processing capabilities.

Figure 19:
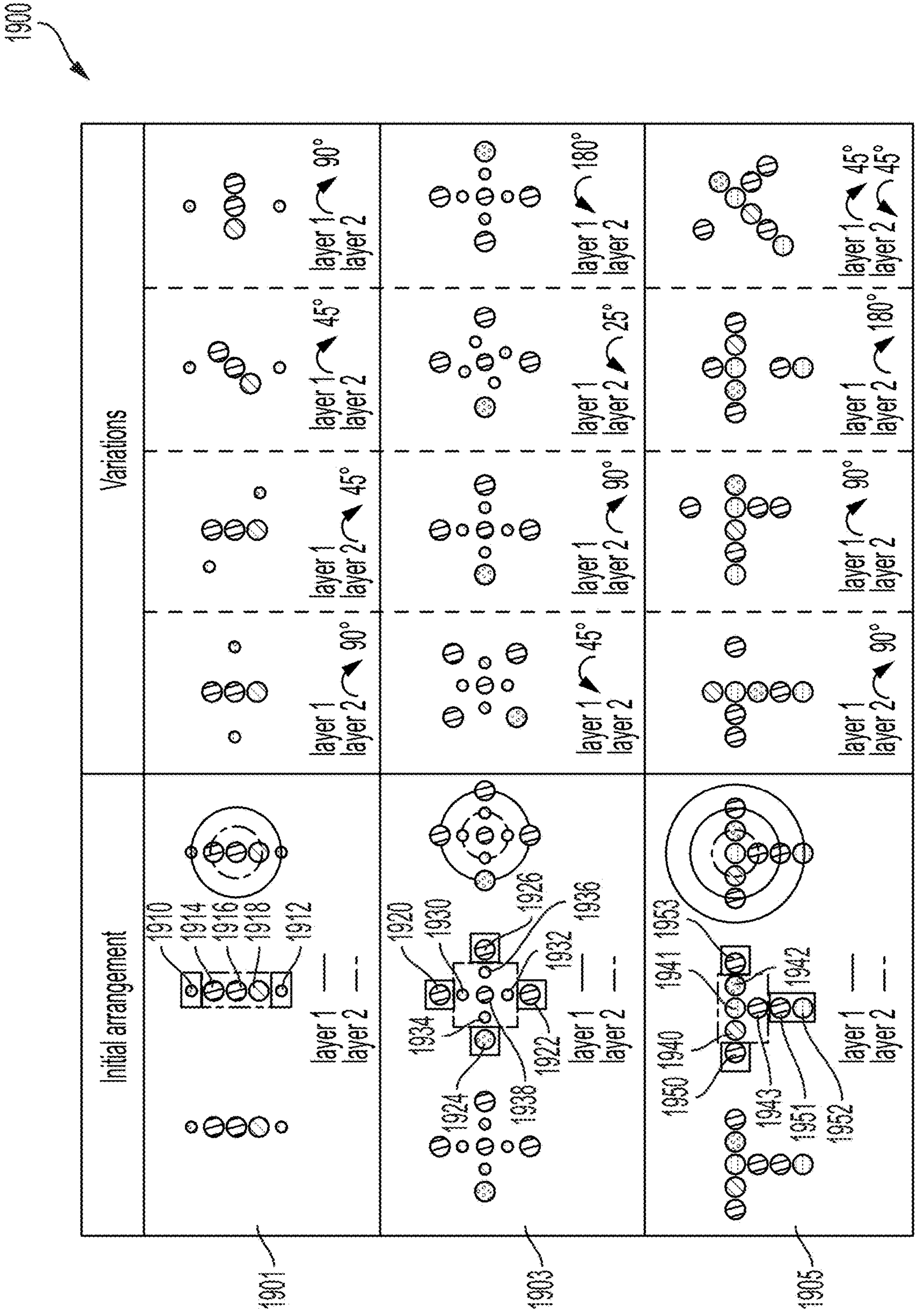
FIG. 19 shows a table illustrating examples of dynamic changes in nozzle tip arrangements for an extruder in accordance with some implementations of this disclosure.

FIG. 19 shows a table 1900 illustrating examples of dynamic changes in nozzle tip arrangements for an extruder, in accordance with some implementations of this disclosure.

The disclosed systems offer advantages through varying deposition options, such as "dynamic deposition." During the printing process, the arrangement of nozzle tips can be dynamically adjusted, as illustrated in the table 1900, which depicts several adaptable configurations. In some implementations, with vertically stacked nozzles (e.g., FIG. 8), each layer of nozzles is independently capable of rotation, either clockwise or counterclockwise. In this example, the nozzles in the lower layers are configured to manage the outer tips, while those in the upper layers control the inner nozzles. This dynamic arrangement enhances flexibility and precision in material deposition.

Table 1900 shows the initial arrangement of these nozzles (bottom view), depicting the specific nozzles in each layer. Additionally, it illustrates the circular path followed by the nozzle tips on each layer. The table 1900 also presents a 'variations' column, which includes scenarios where specific layers, such as layers 1 and 2, might rotate independently, altering the overall arrangement. While there's an option to rotate all layers uniformly, individual rotation of each layer is also feasible. This flexibility allows for the simultaneous rotation of multiple layers, creating new arrangements.

As shown in the first arrangement 1901, the first layer includes two "outer" nozzle tips 1910, 1912, while the second layer includes three "inner" nozzle tips 1914, 1916, 1918, all arranged in a linear configuration. The outer nozzle tips 1910, 1912 can rotate either clockwise or counterclockwise, while the inner nozzle tips 1914, 1916, 1918 also have the capability to rotate either clockwise or counterclockwise. As described, the nozzle tips in the first and second layers can rotate either together or independently.

As shown in the second arrangement 1903, the first layer includes four "outer" nozzle tips 1920, 1922, 1924, 1924 and five "inner" nozzle tips 1930, 1932, 1934, 1936, 1938. The inner nozzle tips 1930, 1932, 1934, 1936, 1938 are capable of rotating either clockwise or counterclockwise, while the outer nozzle tips 1920, 1922, 1924, 1924 can also rotate either clockwise or counterclockwise. As described, the nozzle tips in each layer may rotate together or independently.

As shown in the third arrangement 1905, the first layer includes four "outer" nozzle tips 1950-1954 and four "inner" nozzle tips 1940-1943. The inner nozzle tips 1940-1943 rotate either clockwise or counterclockwise, while the outer nozzle tips 1950-1954 also rotate either clockwise or counterclockwise. As described, the nozzle tips on the first and second layers can rotate together or independently.

The size of each nozzle tip may vary, and the printer material being dispensed from each nozzle tip may also vary, offering additional flexibility in material deposition and printing applications.

Artificial intelligence ("AI") could be employed to determine the most optimized arrangement of the nozzle tips for a particular print. This use of AI and optimization could significantly enhance the printing process, allowing for the nozzle arrangement to be precisely tailored to the considerations of the print job. This dynamic adjustment capability adds a significant level of adaptability to 3D printing, enabling more complex and customized printing options.

The nozzles can be mounted on a rotational base, which allows for flexible movement and arrangement of the nozzle tips. This base is designed to rotate about the z-axis, enabling a wide range of motion. For instance, if the nozzles are arranged in a vertical line, this setup is suitable for printing horizontal lines but not vertical ones. To address this limitation, the rotational base can be used to rotate the entire arrangement of nozzles. This rotation not only makes it possible to print vertical lines and curves but also allows for the adjustment of the nozzle arrangement itself. By utilizing this rotational feature, the printer gains a significant degree of versatility in the types of shapes and patterns it can produce, enhancing its overall functionality.

Figure 20:
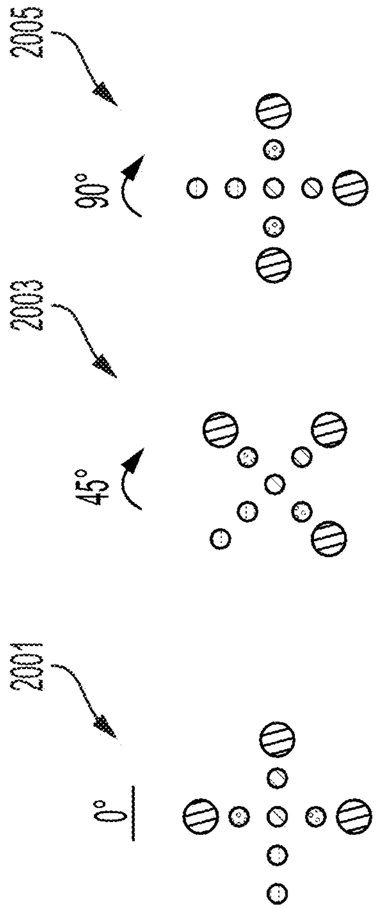
FIG. 20 shows movement of example nozzle tips arrangement in accordance with some implementations of disclosure.

FIG. 20 shows movement of example nozzle tips arrangement in accordance with some implementations of disclosure.

As shown, in some implementations, there are nine nozzle tips are arranged in a "cross" formation 2001. As shown, the size of each nozzle tip may vary, and the printer material being dispensed from each nozzle tip may also vary, offering additional flexibility in material deposition and printing applications.

In this example, rotating the base plate causes all nine nozzle tips to rotate 45° clockwise, transforming the initial "cross" formation 2001 into a 45° rotated configuration 2003. Similarly, rotating the base plate 90° clockwise repositions the nozzle tips into a "cross" formation rotated 90° 2005 from the initial arrangement 2001. As previously described, the rotation angle is not limited to 45° or 90°, and the rotation direction can be either clockwise or counter-clockwise.

Figure 21:
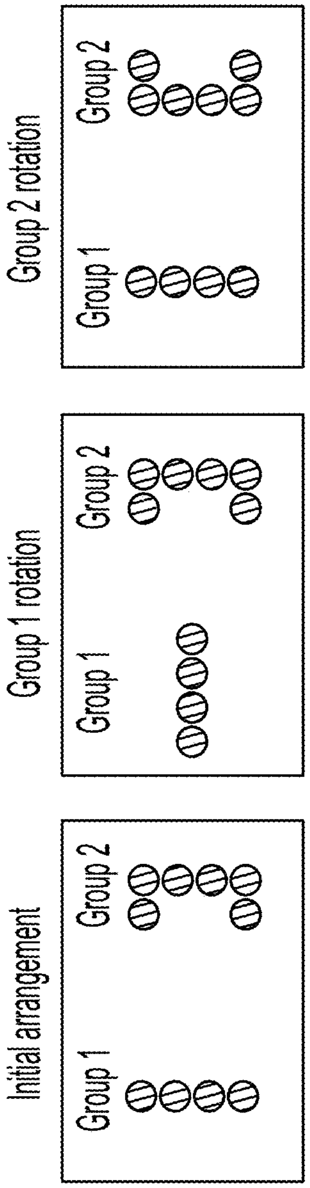
FIG. 21 illustrates an example of clustered nozzle tips, where each group of nozzle tips can rotate independently, or all groups can rotate together in accordance with some implementations of disclosure.

FIG. 21 illustrates an example of clustered nozzle tips, where each group of nozzle tips can rotate independently, or all groups can rotate together. When printing on an inclined surface, the base plate can rotate about the x-axis or y-axis to adapt to the surface angle.

As shown, the initial arrangement of Group 1 includes four nozzle tips in a linear formation, while the configuration of Group 2 includes four nozzle tips in a linear formation with two additional nozzle tips, forming a "U"-shaped arrangement rotated 90° to the left.

For example, "Group 1 rotation" in FIG. 20 shows that the nozzle tips of Group 1 rotate clockwise by 90° or counter-clockwise by −90°. "Group 2 rotation" in FIG. 20 shows that the nozzle tips of Group 2 rotate clockwise by 180° or counter clockwise by −180°.

Figure 22:
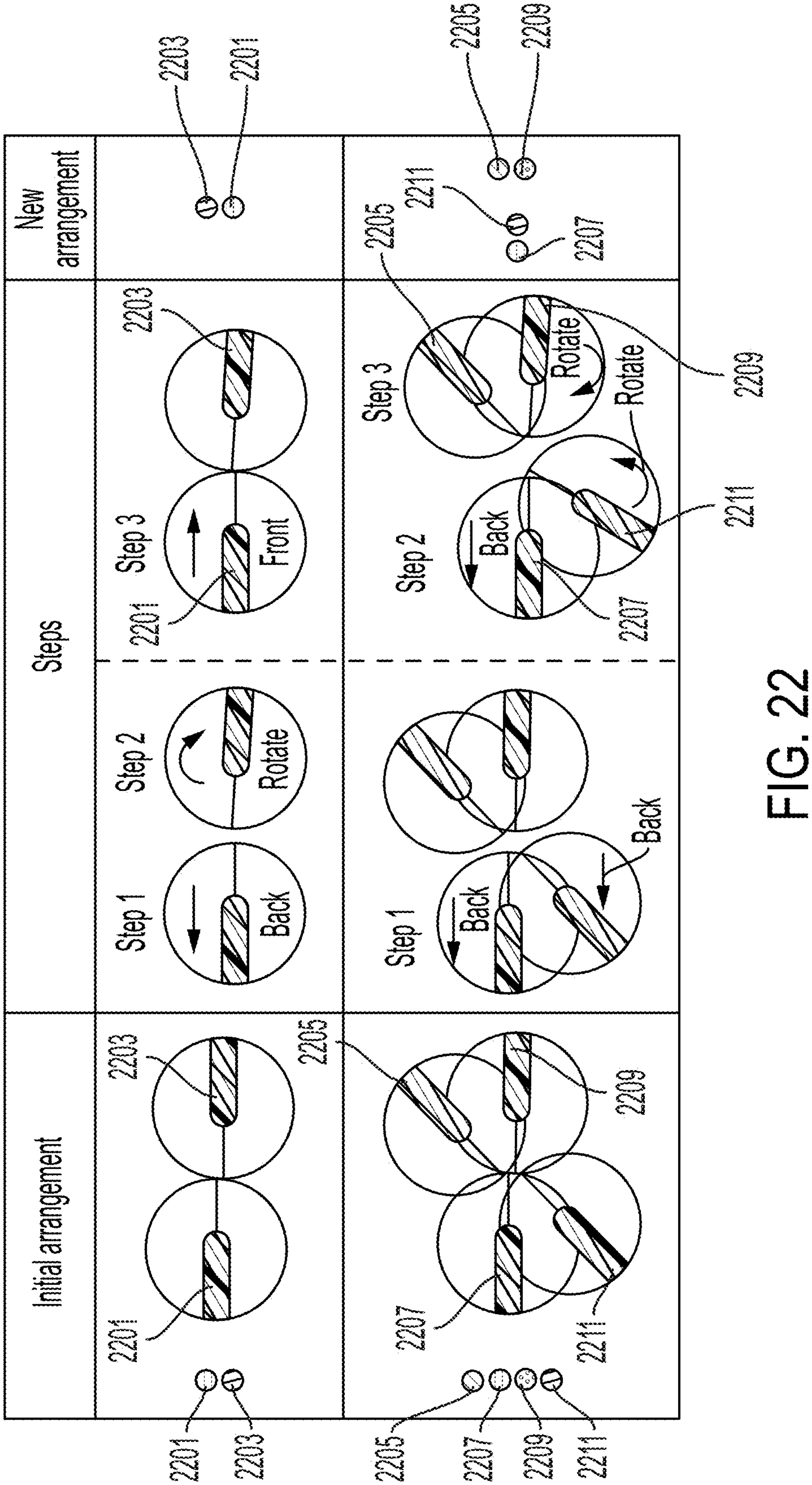
FIG. 22 illustrates how the arrangement of the nozzles can be adjusted by moving individual nozzles in accordance with some implementations of the disclosure.

FIG. 22 illustrates how the arrangement of the nozzles can be adjusted by moving individual nozzles, in accordance with some implementations of the disclosure.

The nozzles have the ability to move back and forth as well as rotate. However, in this example, they do not move radially within the same layer due to the presence of other nozzles. Instead, the nozzles retract backward to create space, allowing other nozzles to adjust their positions. After these adjustments, the nozzles move forward again to establish a new arrangement. FIG. 22 provides examples of how individual nozzles can be dynamically repositioned to achieve different configurations.

As shown, the first nozzle tip 2201 and the second nozzle tip 2203 are initially arranged linearly in the order of the first nozzle tip 2201 followed by the second nozzle tip 2203. To create a new arrangement, the first nozzle tip 2201 retracts backward, allowing the second nozzle tip 2203 to rotate into position. Once the second nozzle tip 2203 has rotated, the first nozzle tip 2201 moves forward to finalize the new arrangement. In this new configuration, the order of the nozzle tips is reversed, with the second nozzle tip 2203 now preceding the first nozzle tip 2201.

As shown, the third nozzle tip 2205, fourth nozzle tip 2207, fifth nozzle tip 2209, and sixth nozzle tip 2211 are initially arranged linearly in the order: third nozzle tip 2205, fourth nozzle tip 2207, fifth nozzle tip 2209, and sixth nozzle tip 2211. In Step 1, both the fourth nozzle tip 2207 and the sixth nozzle tip 2211 retract backward. In Step 2, the fourth nozzle tip 2207 retracts further to create space for the sixth nozzle tip 2211 to rotate. In Step 3, the fifth nozzle tip 2209 rotates to finalize the new arrangement. In this new configuration, the fourth nozzle tip 2207 and the sixth nozzle tip 2211 form a group, while the third nozzle tip 2205 and the fifth nozzle tip 2209 form another group.

With respect to the static and/or dynamic nozzle tips, the following arrangements and nozzle configurations may be utilized.

Nozzle tips can be arranged in countless ways, as several parameters can vary when creating these arrangements. The number of nozzles plays a significant role, with configurations ranging from as few as two nozzles to hundreds. While increasing the number of nozzles can reduce printing time, it requires adding and connecting more components to the setup. Additionally, the nozzle diameter can greatly affect the number of possible arrangements; even slight changes in diameter can multiply the variety of configurations. And, the extruded material in each nozzle can differ, with each nozzle capable of dispensing unique materials that remain uncontaminated by others.

Figure 23:
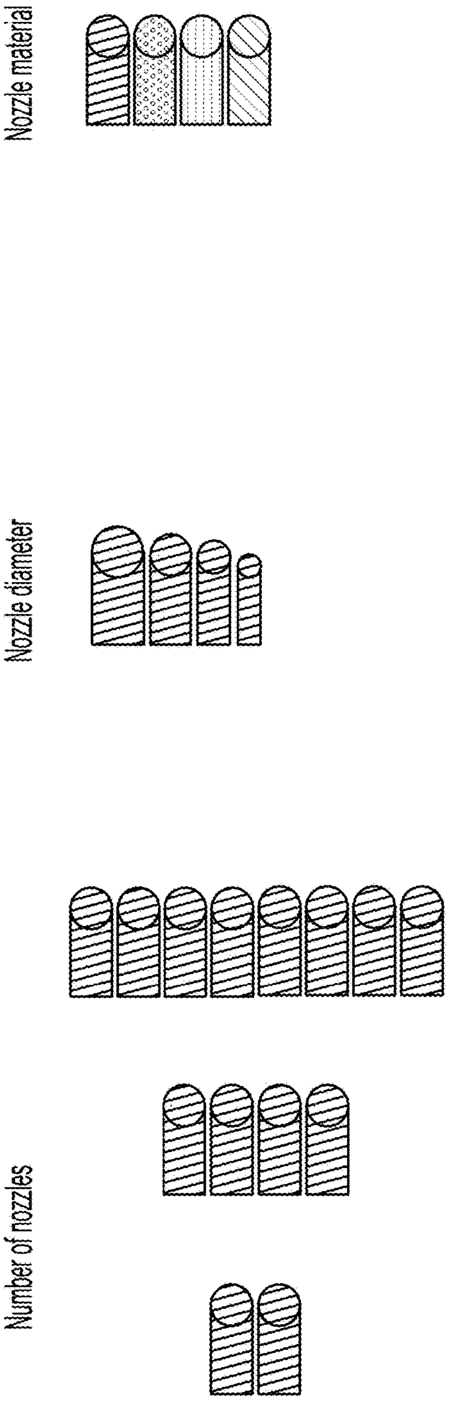
FIG. 23 illustrates example configurations of bent or curved nozzles in accordance with various implementations of the disclosure.

FIG. 23 illustrates example configurations of bent or curved nozzles in accordance with various implementations of the disclosure.

As illustrated in FIG. 23, in some implementations, the 3D printer' extruder can be configured with varying numbers of nozzles. For example, two bent nozzles may be arranged in a straight-line pattern, four bent nozzles may also be arranged in a straight-line pattern, or eight nozzles may be arranged in a similar linear configuration. Additionally, in some implementations, the 3D printer can feature bent nozzles of different sizes. For instance, FIG. 23 shows four bent nozzles of varying sizes arranged in a specific pattern. Furthermore, the 3D printer can include multiple bent nozzles, each capable of dispensing different printing materials. For example, FIG. 23 depicts a configuration where four nozzles are associated with distinct printing sources.

Figure 24:
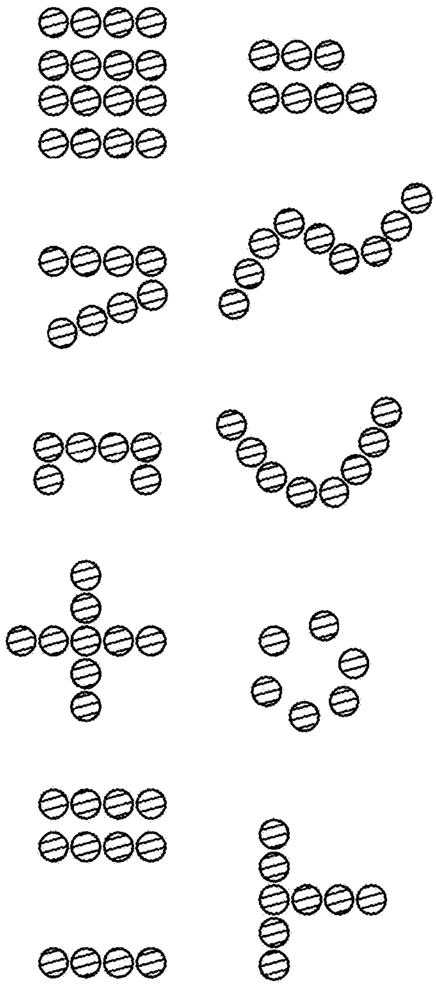
FIG. 24 illustrates example configurations of bent or curved nozzles in accordance with some implementations of this disclosure.

FIG. 24 illustrates example configurations of bent or curved nozzles in accordance with some implementations of this disclosure.

As shown, the bent or curved nozzles can be arranged in various shapes depending on a desired output of the 3D printer. The shape can include a linear pattern, a circular pattern, "T" shape, "cross" shape, and more as shown in FIG. 24.

Figure 25:
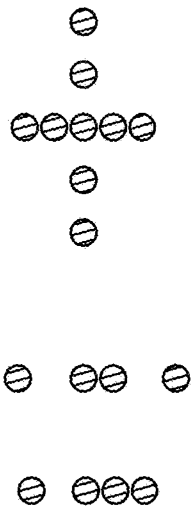
FIG. 25 illustrates example configurations of bent or curved nozzles in accordance with some implementations of this disclosure.

FIG. 25 illustrates example configurations of bent or curved nozzles in accordance with some implementations of this disclosure.

As shown, the bent or curved nozzles can be arranged such that the distance between the nozzle change.

Figure 26:
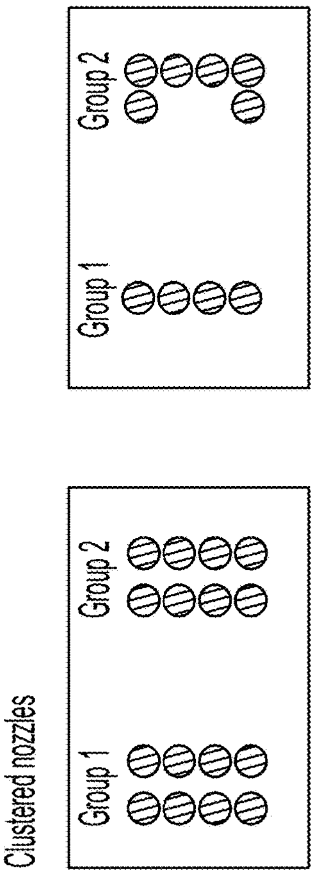
FIG. 26 illustrates example configurations of bent or curved nozzles in accordance with some implementations of this disclosure.

FIG. 26 illustrates example configurations of bent or curved nozzles in accordance with some implementations of this disclosure.

As illustrated, bent or curved nozzles can be organized into clusters (e.g., groups). These clusters can operate independently to print different areas or work collaboratively by printing on the same area. For example, one cluster may initiate the printing process, while another cluster follows after a short delay to deposit additional material onto the previously printed section.

As shown with example on the left, each cluster (e.g., a group of nozzles) can features the same nozzle arrangement. As shown with example on the right, alternatively, each cluster (e.g., a group of nozzles) can be configured with different nozzle arrangements.

Figure 27:
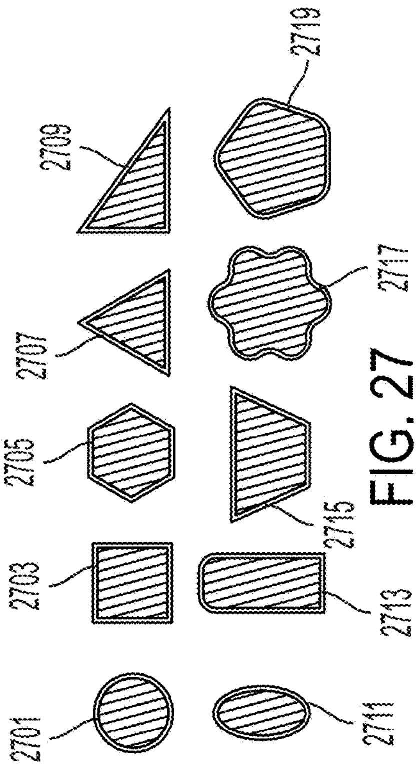
FIG. 27 illustrates example shapes of bent or curved nozzle tips in accordance with some implementations of this disclosure.

FIG. 27 illustrates example shapes of bent or curved nozzle tips in accordance with some implementations of this disclosure.

As shown, while a circular nozzle tip is the most common shape, other tip shapes can also be utilized. FIG. 27 illustrates a few examples of nozzle tip shapes, including oval 2711, square 2703, triangular 2707, right-angle triangular 2709, hexagonal 2705, trapezoidal 2715, circular 2701, rectangular with rounded edges 2713, pentagonal with rounded edges 2719, and hexagonal with rounded edges 2717.

Figure 28:
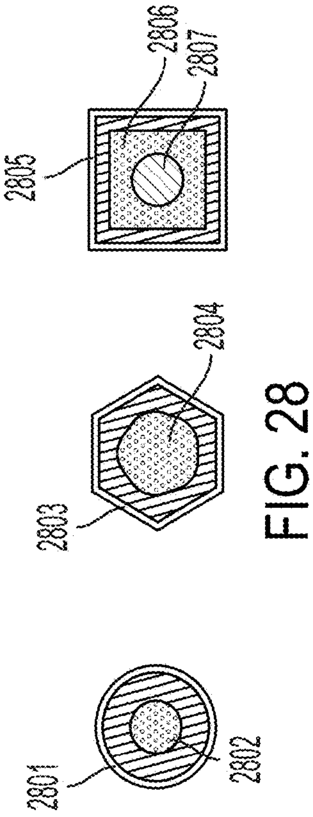
FIG. 28 depicts example coaxial nozzles in accordance with some implementations of this disclosure.

FIG. 28 depicts example coaxial nozzles in accordance with some implementations of this disclosure. Each coaxial nozzle includes at least two nozzles, with one nozzle positioned within another, allowing each nozzle to extrude a different material.

As illustrated in FIG. 28, a circular coaxial nozzle (2801) is shown with an inner circular nozzle 2802. Additionally, a hexagonal coaxial nozzle 2803 is depicted with an inner pentagonal nozzle featuring rounded edges 2804. Furthermore, FIG. 28 presents a square coaxial nozzle 2805 configured with another square nozzle 2806, which includes a circular inner nozzle 2807.

Figure 29:
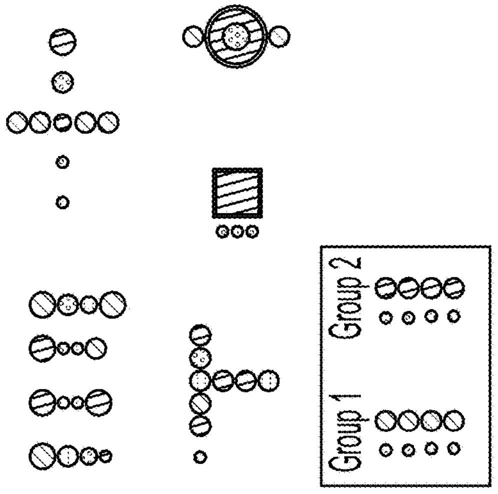
FIG. 29 illustrates various arrangements of nozzle tips in accordance with some implementations of this disclosure.

FIG. 29 illustrates various arrangements of nozzle tips in accordance with some implementations of this disclosure.

As described, several parameters can be considered when arranging nozzle tips, including the shape and size of the nozzle tips, the number of tips, and the number of printing materials to be extruded. Proper arrangement of nozzle tips can enhance the printing speed, quality and precision of the printed output. FIG. 27 demonstrates a few example arrangements, while FIGS. 30-33 illustrate potential printing outcomes achieved using these configurations.

Figure 30:
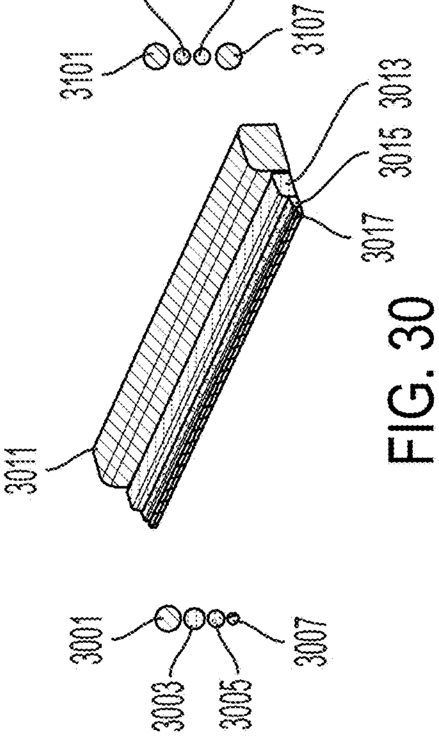
FIG. 30 through FIG. 33 illustrate printing outcomes achieved using various nozzle configurations.

As illustrated in FIG. 30, four nozzles with varying nozzle tip sizes are used to print a gradient structure. In this example, each nozzle tip extrudes a different printing material. A first printing material from the first nozzle tip 3001 creates a first bar structure 3011, a second printing material from the second nozzle tip 3003 forms a second bar structure 3013, a third printing material from the third nozzle tip 3005 produces a third bar structure 3015, and a fourth printing material from the fourth nozzle tip 3007 constructs a fourth bar structure 3017. The size of each nozzle tip corresponds to the size of the bar structure it creates in this example.

Figure 31:
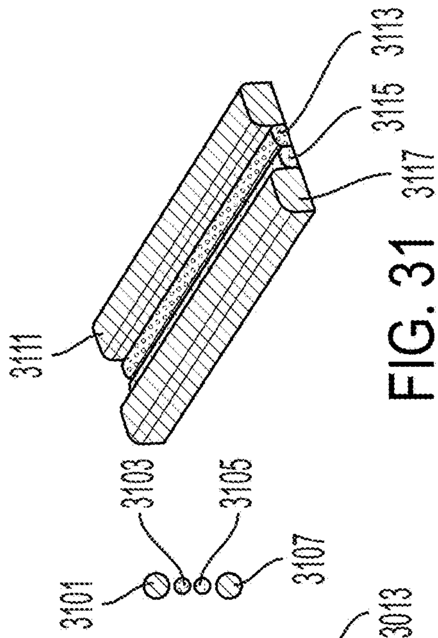

As shown in FIG. 31, four nozzles with varying nozzle tip sizes are used to print a structure with two walls. A first printing material from the first nozzle tip 3101 creates a first bar structure 3111, a second printing material from the second nozzle tip 3103 forms a second bar structure 3113, a third printing material from the third nozzle tip 3105 produces a third bar structure 3115, and the first printing material from the fourth nozzle tip 3107 constructs a fourth bar structure 3117. The size of each nozzle tip corresponds to the size of the bar structure it creates in this example.

Figure 32:
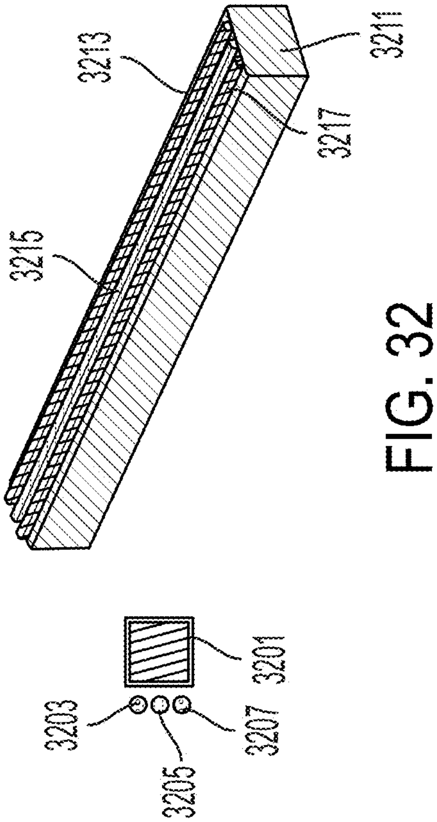

As shown in FIG. 32, one square shape nozzle tip and three circular nozzle tips are used to print a structure with two layers. As shown, a first printing material from the square shape nozzle tip 3201 creates a first bar structure 3211. A second printing material from the first circular nozzle tip 3203 creates a first line structure 3213 on the first bar structure 3211. A third printing material from the second circular nozzle tip 3205 creates a second line structure 3215 on the first bar structure 3211. The second printing material from the third circular nozzle tip 3207 creates a third line structure 3217 on the first bar structure 3211.

Figure 33:
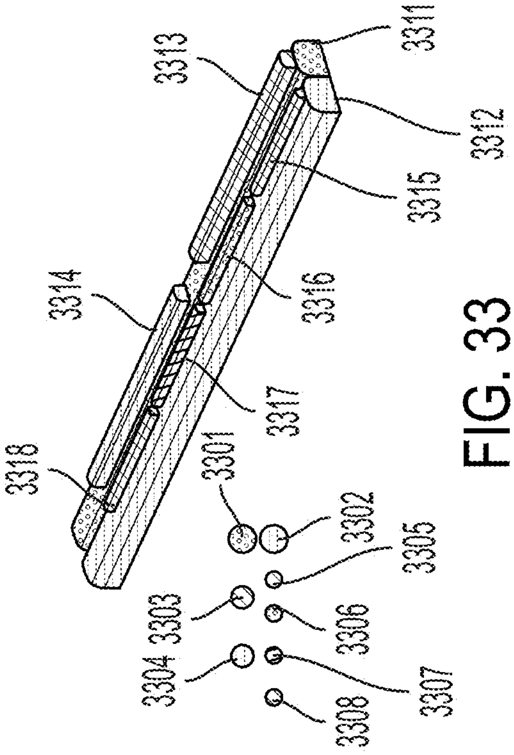

As shown in FIG. 33, eight circular nozzle tips are used to print a structure with dashed lines. As shown, a first printing material from a first circular nozzle tip 3301 creates a first line structure 3311. A second printing material from a second circular nozzle tip 3302 creates a second line structure 3312. A third printing material from a third circular nozzle tip 3303 creates a third line structure 3313 on the first line structure 3311. A second printing material from a fourth circular nozzle tip 3304 creates a fourth line structure 3314 on the first line structure 3311. The third printing material from a fifth circular nozzle tip 3305 creates a fifth line 3315 on the second line structure 3312. The first printing material from a sixth nozzle tips 3306 creates a sixth line structure 3316 on the second line structure 3312. A fourth printing materials from a seventh nozzle tip 3307 create a seventh line 3317 on the second line structure 3312. The third printing material from an eighth nozzle tip 3308 creates an eighth line structure 3318 on the second line structure 3312.

Any conventional 3D printer controller can be used and programmed to manage all aspects of the system such as controlling the movement of the extruder system and amount of ink to dispense. Common controllers include Raspberry Pi, which can be equipped with Klipper to enhance functionality, Teensy boards for flexibility, and Replicape, a popular choice for 3D printing. SKR BigTreeTech is another commonly used option, known for its compatibility with motor controllers and touch screens. ARM-based boards like open-source Smoothieboards are specifically designed for 3D printers, while microcontrollers such as Arduino provide open-source, easily programmable solutions for custom configurations. The controller programs may include AI or machine learning, as discussed above, for control of the nozzle position, configuration, timing, base rotational control, and printing.

The system components to be controlled include stepper motors for movement along the X, Y, and Z Cartesian planes, as well as stepper motors for rotational movement. Plunger motors are used to control the plunger, with their number depending on how many nozzles are activated simultaneously. Heating elements in the nozzles may be required for certain materials, along with heating elements for the deposition bed to ensure proper material adhesion. Cooling fans are also necessary for material cooling to maintain consistent print quality.

The disclosed 3D printer can be customized to meet specific requirements by adjusting various printing parameters. These include extrusion rate or flow rate, the distance between the nozzle and the substrate, infill percentage and pattern, nozzle material and coating, the spacing and arrangement of nozzles, the rotational angle of the base, extrusion temperature, layer thickness, and the shape and length of the nozzles.

Figure 34:
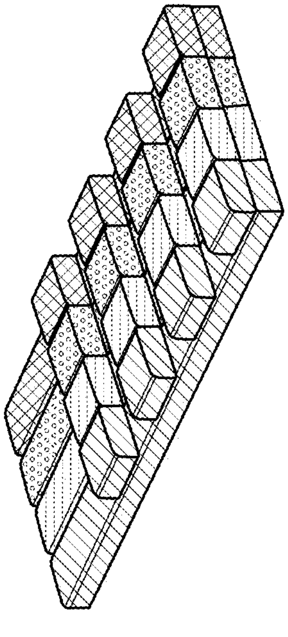
FIG. 34 shows a dashed line pattern created by setting the extrusion flow rate of the 3D printer to a discontinuous flow rate in accordance with some implementations of this disclosure.

Typically, the extrusion flow rate is continuous and synchronized with the printing speed. However, a discontinuous flow rate, such as the dashed line pattern shown in FIG. 34, can be utilized. This method enables the creation of unique infill patterns that are otherwise unachievable, potentially improving the mechanical properties of the printed object.

Figure 35A:
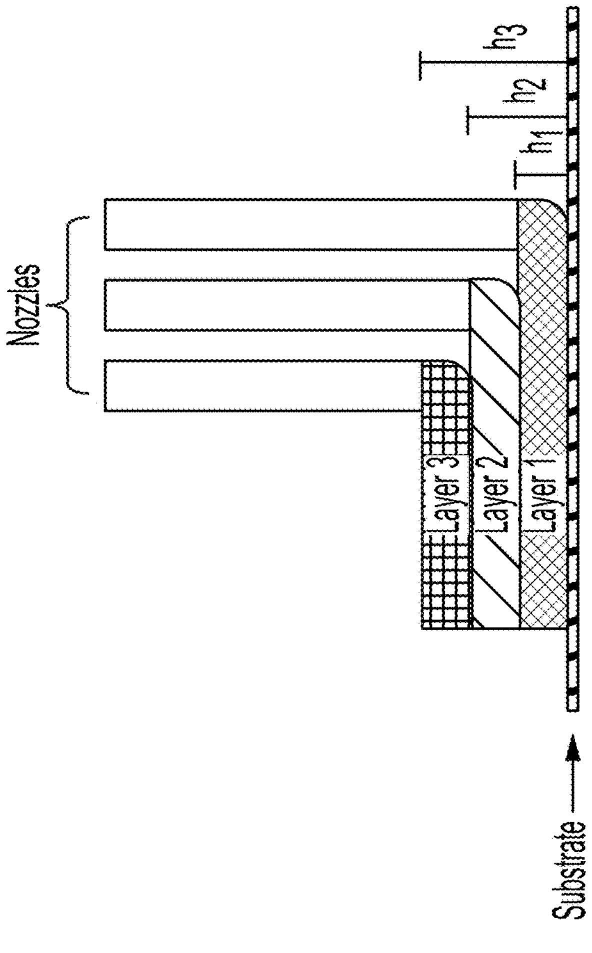
FIG. 35A and FIG. 35B show that a distance between each nozzle and a substrate can differ in accordance with some implementations of this disclosure.
Figure 35B:
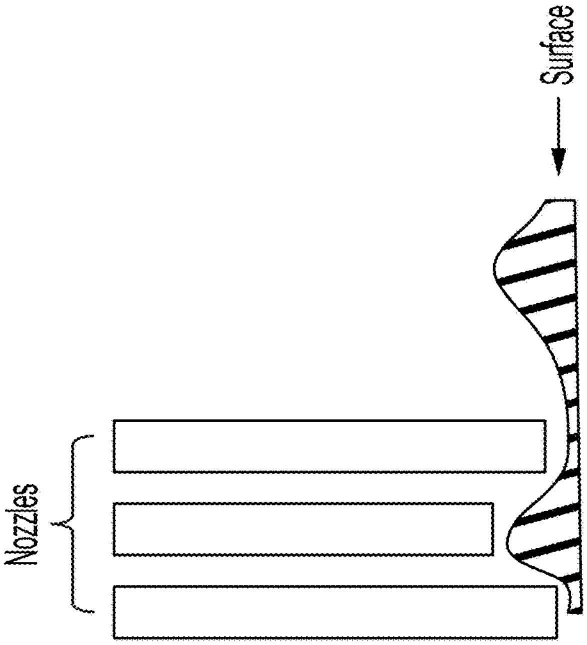

The distance between the nozzle tip and the substrate need not remain constant. For example, as shown in FIG. 35B, printing on irregular or non-flat surfaces requires varying this distance. Similarly, when printing multiple layers simultaneously, as depicted in FIG. 35A, the distance between each nozzle and the substrate can differ.

The infill percentage and shape are critical factors in determining the mechanical properties of the print. A higher infill percentage generally results in a stronger structure, while the infill shape also impacts performance. Using multiple nozzles can significantly reduce the time required for infilling without compromising quality.

In a multi-nozzle configuration, the materials and coatings of the nozzles can vary to optimize the extrusion process. Some materials perform better with specific nozzle materials, improving the efficiency and quality of the printing.

Nozzles do not need to be aligned in a straight line. They can be arranged in various configurations to suit the application's requirements. The spacing between nozzles can also be adjusted based on the shape of the print and the materials being extruded.

Rotating the base allows for greater versatility in printing patterns. For instance, lines can transition from horizontal to vertical, and circles can be printed using the rotational base. In straight-line nozzle arrangements, rotating the base by angles such as 45 degrees can bring printed lines closer together, transitioning them from parallel to overlapping. This also helps reduce the spacing between printed lines.

Some materials require pre-heating before extrusion. In multi-material setups, each nozzle may require a distinct temperature to accommodate the specific material being used. These temperature variations are crucial for achieving the desired layer thickness and overall print quality.

The use of varying nozzle shapes enables compact arrangements of multiple nozzles. Parameters such as nozzle length, bent angle, bent location, number of bends, and bend shape all influence how nozzles can be stacked or arranged together.

By adjusting these parameters, the 3D printing process can be tailored to meet specific requirements, increasing its flexibility and effectiveness across various applications.

Figure 36:
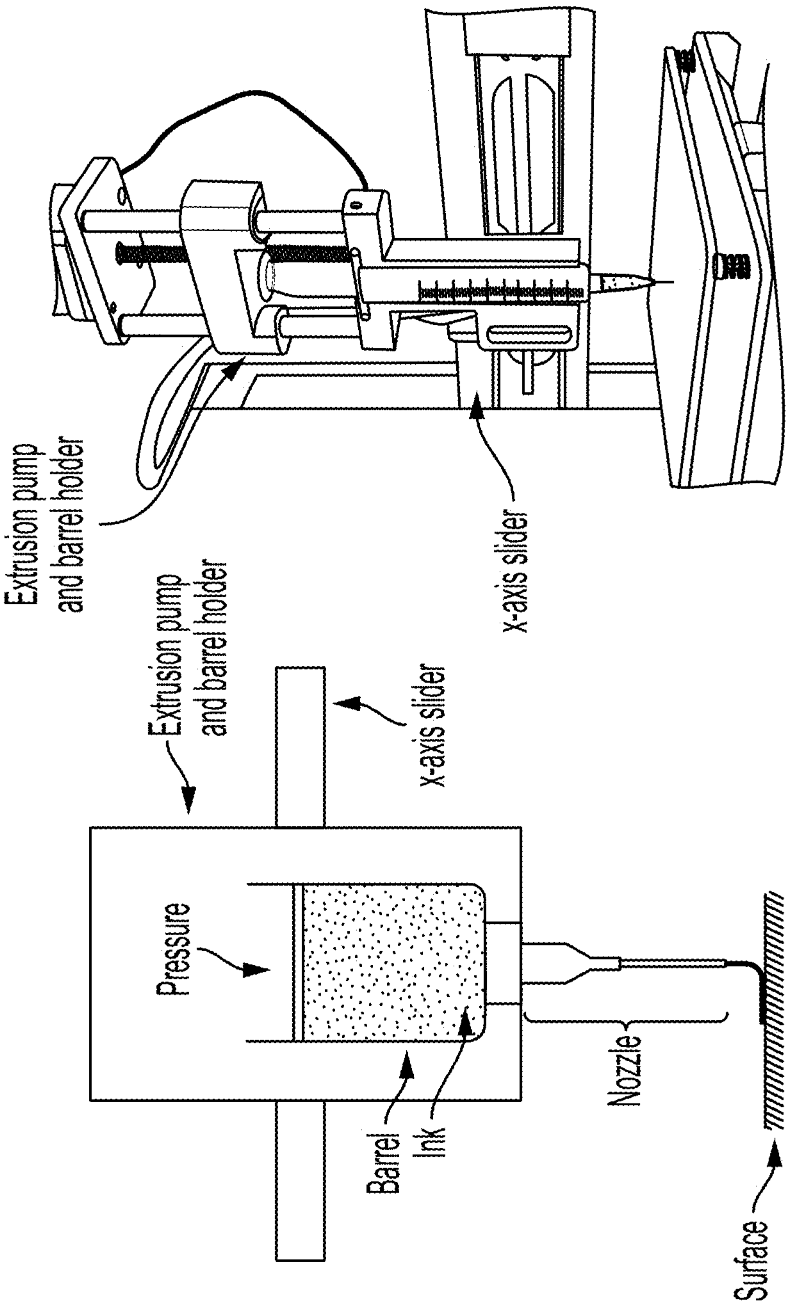
FIG. 36 illustrates a method of Direct Ink Writing (DIW) employing a syringe or barrel for ink extrusion.

FIG. 36 illustrates a method of Direct Ink Writing (DIW) employing a syringe or barrel for ink extrusion. As shown, the method involves a syringe or barrel filled with ink that is connected to an extrusion pump. The pump applies controlled pressure to force the ink through the nozzle. The barrel is held in a fixed position by a barrel holder, which is attached to an x-axis slider. The x-axis slider moves the barrel and nozzle along a predetermined path to facilitate accurate printing. The printing process is performed on a flat surface using a straight nozzle, ensuring that the nozzle tip remains parallel to the printing surface throughout the process. This design allows for precise and accurate placement of ink at the desired location on the substrate.

While this setup is effective for flat and gently curved surfaces, it encounters limitations when dealing with internal surfaces of pipes, hollow structures, or partially open geometries. For example, printing on the internal surface of a pipe requires the nozzle tip to remain parallel to the pipe's internal surface, which is difficult with the current configuration. Additionally, integrating the nozzle, barrel, syringe pump, and x-axis slider into the confined space of a pipe is impractical, limiting the method's versatility for certain applications.

Figure 37A:
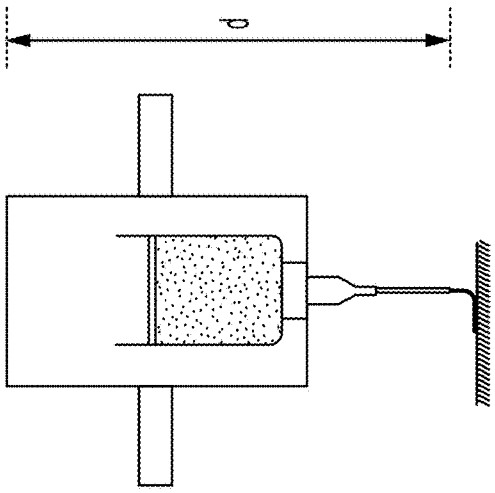
FIG. 37A and FIG. 37B compare the vertical distance when using a straight nozzle versus a bent nozzle.
Figure 37B:
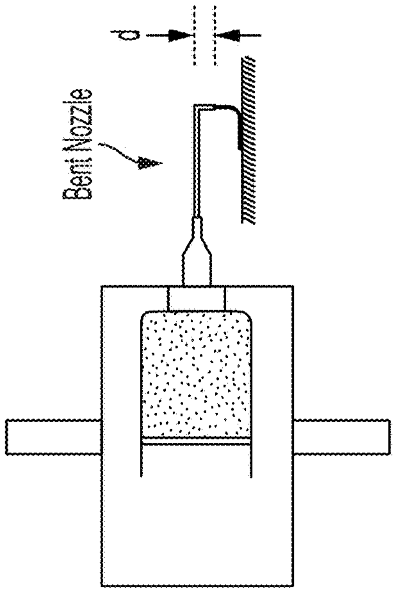

To address the limitations of the extrusion-based 3D printing (e.g., extrusion based 3D printing) for internal printing within pipes, hollow structures, and partially open geometries, this disclosure introduces a novel method that employs bent and curved nozzles in place of traditional straight nozzles. As shown in FIG. 37A, when using a straight nozzle, the vertical distance D must fit within the internal dimensions of the pipe, in addition to the space required by the x-axis slider. However, FIG. 37B illustrates that bent or curved nozzles require only a small portion of the nozzle to fit within the pipe, thereby significantly reducing the vertical space needed. This reduction in vertical distance D is achieved because the additional components of the printer-such as the barrel, extrusion pump, and x-axis slider-do not need to be placed inside the pipe. By using bent and curved nozzles, the nozzle tip can maintain a position that is parallel to the internal surface of the pipe, enabling accurate and efficient material deposition during printing. While pipes are referenced as examples in this description, the method is also applicable to hollow and partially open structures.

Figure 38A:
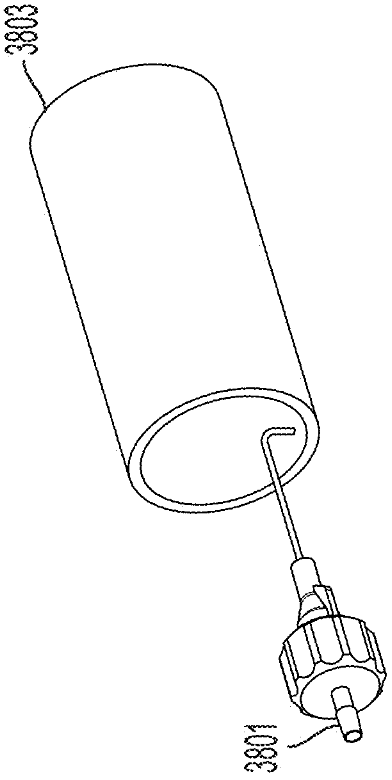
FIG. 38A and FIG. 38B illustrate the use of bent and curved nozzles within pipes, in accordance with certain implementations of the present disclosure.
Figure 38B:
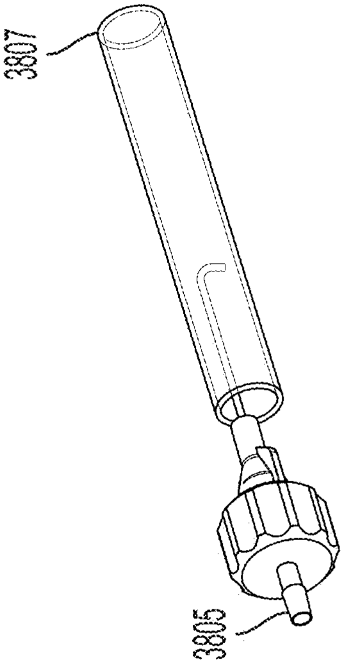

FIG. 38A and FIG. 38B illustrate the use of bent and curved nozzles within pipes, in accordance with certain implementations of the present disclosure. In FIG. 38A, a larger pipe 3803 allows the entire nozzle 3801 to fit within the internal space. In contrast, FIG. 38B demonstrates that in a smaller pipe 3807, only a portion of the nozzle 3805 extends into the pipe 3807, constrained by the nozzle's length after the bend. This design significantly enhances flexibility and adaptability, enabling the 3D printing system to accommodate a wide variety of hollow and partially open structures—shown with different pipe sizes and geometries in FIG. 38A and FIG. 38B—while maintaining effective and accurate material deposition.

Figure 39:
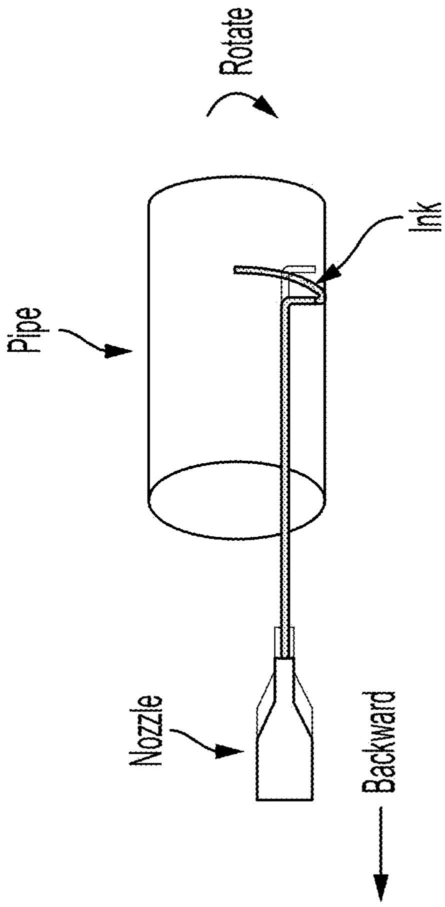
FIG. 39 and FIG. 40 provide an overview of the internal surface printing in accordance with some implementations of the disclosure.

FIG. 39 provides an overview of the internal surface printing in accordance with some implementations of the disclosure.

As shown, to create the desired shapes on the inner surface of a hollow and partially open structure (a pipe is used as an example here), the 3D printer's controller is configured to manage the motion of both the nozzle and the pipe. During this process, the controller operates a rotator configured to rotate the pipe (e.g., clockwise rotation, counterclockwise rotation, or stationary). It also adjusts the nozzle's movements-such as forward, backward, upward, downward, or stationary-depending on the specific shape being printed. Simultaneously, the controller manages the pump in fluid communication with the nozzle, enabling ink to be accurately applied to the internal surface of the pipe. In essence, the controller coordinates the movements of the nozzle and the pipe while ensuring the precise deposition of the correct amount of material onto the pipe's internal surface.

Figure 40:
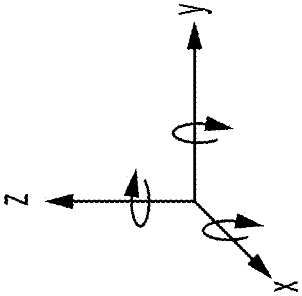

The range of movements (degrees of freedom) for 3D printer systems utilizing bent or curved nozzles is influenced by the characteristics of the nozzle and the shape of the structure being printed. Both the nozzle and the structure can move along three linear directions: forward and backward, up and down, and side to side. Additionally, they can rotate around these axes, as illustrated in FIG. 40. Movement can occur simultaneously for both elements, or one can remain stationary while the other moves. Furthermore, each component can move and rotate in all these directions.

However, during the printing process, it is not always necessary to use all degrees of freedom. The choice of coordinate system depends on the shape of the structure being printed. For example, a cylindrical coordinate system is well-suited for printing inside a pipe, a spherical coordinate system is ideal for printing within a sphere, and a Cartesian coordinate system is effective for printing inside a duct.

Figure 41:
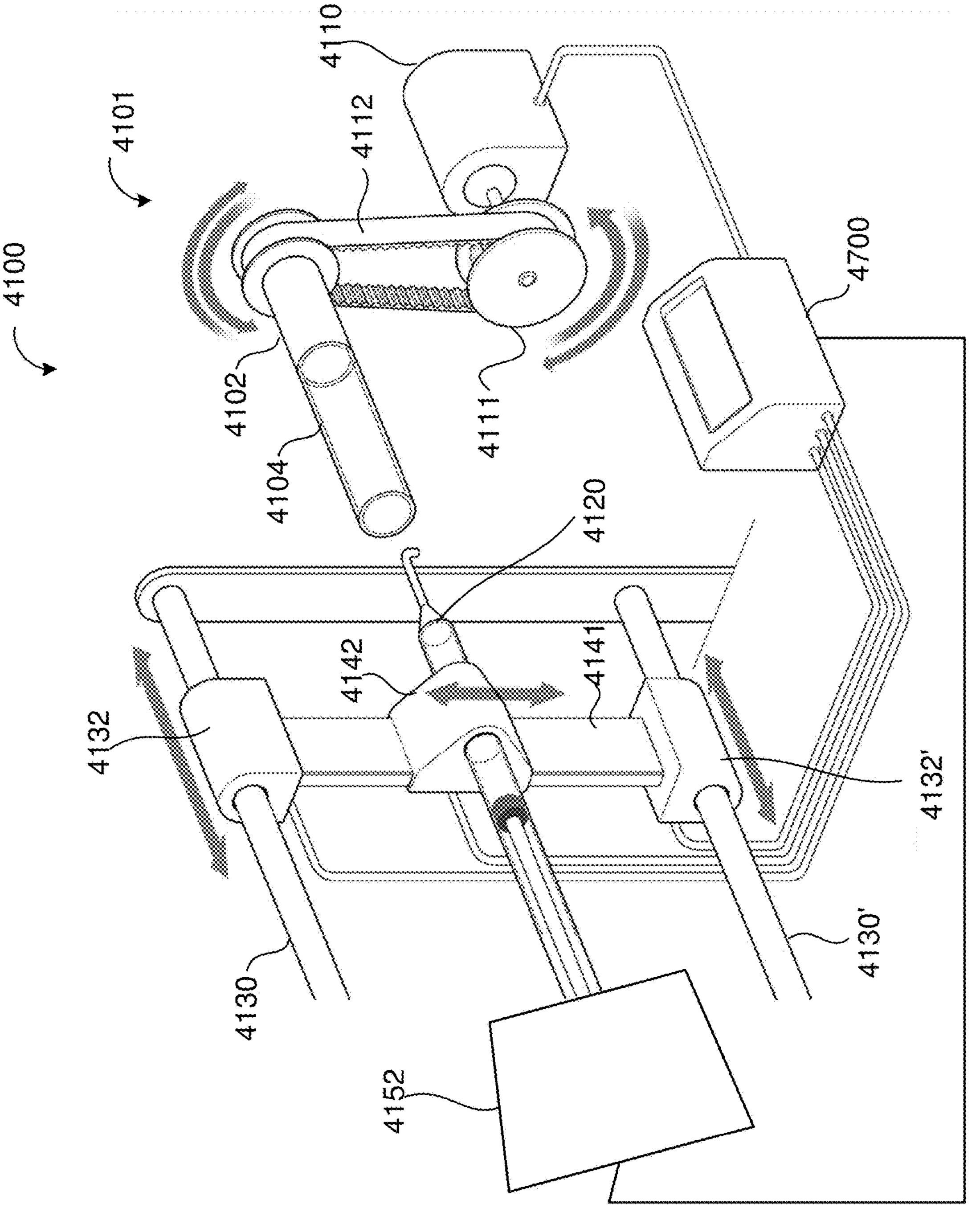
FIGS. 41 and 42 show a 3D printer system for printing on an internal surface of a hollow and partially open structure in accordance with some implementations of the disclosure.
Figure 42:
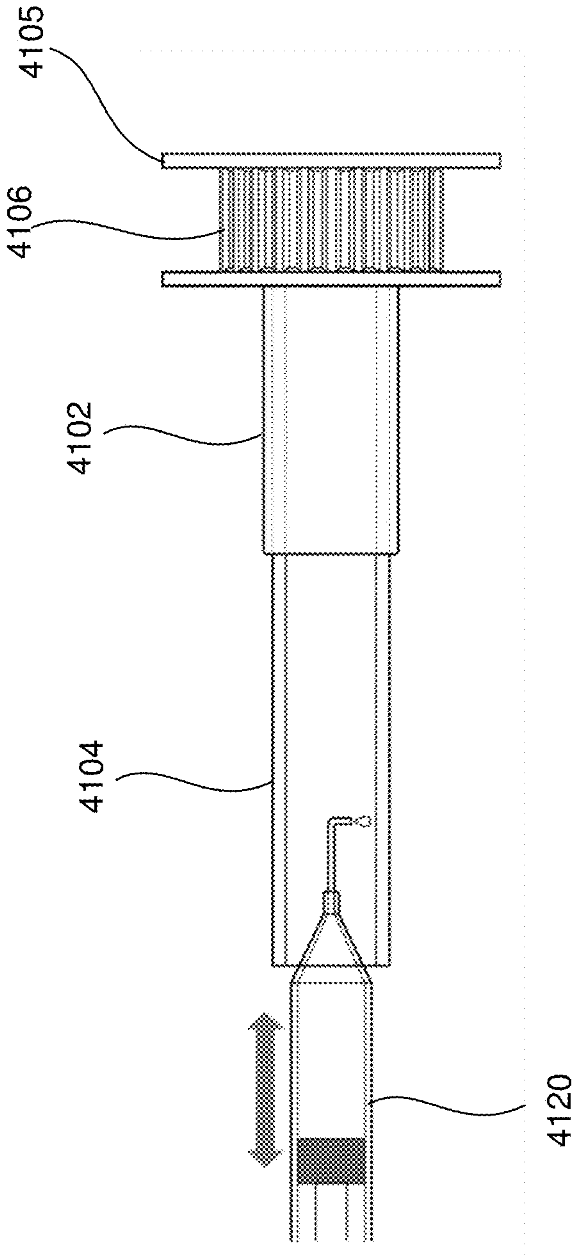

FIGS. 41 and 42 show a 3D printer system for printing on an internal surface of a hollow and partially open structure in accordance with some implementations of the disclosure.

As shown, the system 4100 includes a rotator 4101 configured to rotate the hollow and partially open structure (with a transparent tube 4104 used as an example). As shown, in some implementations, the rotator 4101 includes a holder 4102 configured to secure the hollow and partially open structure (with a transparent tube 4104 used as an example) while rotating. In some implementations, the shape of the holder 4102 corresponds to the shape of the hollow and partially open structure 4104. In this example, the holder 4102 is shaped to match the transparent tube 4104. As a result, at least one end portion of the tube 4104 is within the holder 4102. When the hollow and partially open structure 4104 is bent or the shape of the hollow and partially open structure 4104 is unstable, it can be substantially inserted into the holder 4102, allowing the holder 4102 to support and straighten the structure 4104.

In some implementations, the holder 4102 is equipped with gear teeth 4106 along its surface. In this example, the holder 4102 is integrated with a pully 4105 with gear teeth 4106. In some implementations, the system also includes a motor 4110 (e.g., step motor) with a pully 4111 on its rotating end, connected to the holder 4102 via a belt 4112 that links the motor's rotating end to the pully 4105 of the holder 4102.

As shown, in some implementations, the system 4100 includes a bent or curved nozzle 4120 (in this example, nozzle with a bent nozzle tip) that is configured to move towards and away from the hollow space of the hollow and partially open structure (transparent tube in this example). To move the nozzle 4120 toward and away from the hollow space of the hollow and partially open structure, the nozzle 4120 is associated with a Y-axis linear rail 4130, 4130' actuated by a motor 4132, 4132' (e.g., Y-axis slider).

In some implementations, the system 4100 includes a Z-axis rail 4141 actuated by a motor 4142 (e.g., Z-axis slider), which is also associated with the nozzle 4120. This configuration allows the nozzle 4120 to move upward and downward. Such movement is particularly beneficial for printing on uneven internal surfaces of hollow and partially open structures and for printing two or more overlapping layers.

In some implementations, an ink supplier 4152 (e.g., pump) associated with the nozzle. The ink supplier 4152 supplies ink to the nozzle 4142 so the precise amount of the ink is dispensed when printing on the internal surfaces.

In some implementations, the system 4100 includes a controller 4700 (e.g., control board) which is in communication with the motor 4132, 4132' associated with the Y-axis rail 4130, 4130', the motor 4142 associated with the Z-axis rail 4141, and the ink supplier 4152. The controller 4700 transmits signals to motors associated with the Y-axis rail and Z-axis rail to control the ink dispensing location on the internal surfaces. In some implementations, the controller 4700 transmits signals to the ink supplier 4152 so precise amount of ink is being dispensed at the precise location.

Figure 43:
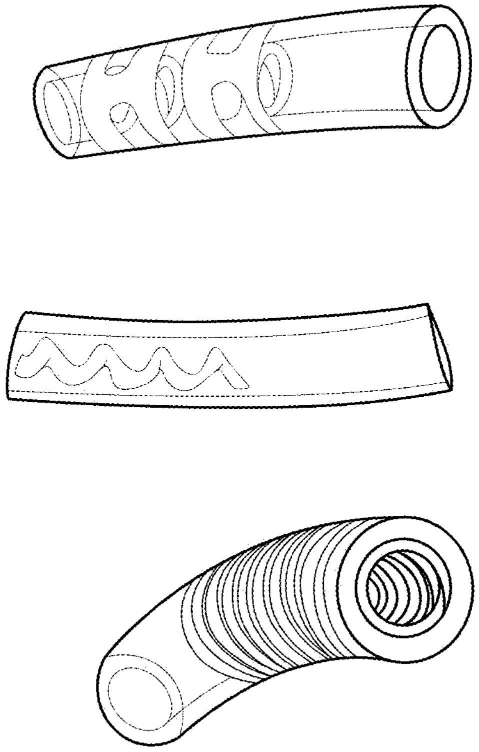
FIG. 43 illustrates various final printing results on the internal surfaces of hollow and partially open structures.

FIG. 43 illustrates various final printing results on the internal surfaces of hollow and partially open structures. As shown, by moving the nozzle in the Y direction (and optionally in the Z direction) while simultaneously rotating it (e.g., clockwise rotation, counterclockwise rotation, or a combination of clockwise and counterclockwise rotations), the system can print a variety of shapes, including circular and zigzag patterns.

As described above, various parameters of bent and curved nozzles can be adjusted to achieve desired printing performance, depending on specific requirements. Several factors influence the selection of nozzle parameters, including ink viscosity, extrusion method, material flow rate, printing speed, and printing resolution. These parameters include multi-material capability, allowing a single nozzle to extrude multiple materials; multi-nozzle setups, which can operate sequentially or in parallel; and co-axial designs, which involve a nozzle within a nozzle or a series of nested nozzles. The nozzle diameter can range from as small as 1 micron to sizes suitable for large structures, and the nozzle length can vary depending on the structure or printing requirements. Additionally, the nozzle material can be selected or altered to meet specific printing needs, and various nozzle geometries, such as tapered or cylindrical shapes, can be employed. Other features and configurations can also be tailored to address unique printing requirements. Additional parameters are further detailed above (e.g., in FIG. 5), as previously discussed.

FIG. 44A through FIG. 44G show various example shapes for pipes and tubes where bent and curved nozzles can be used to print in the internal surfaces that the traditional 3D printers are unable to print on the internal surfaces of the shapes.

Figure 44A:
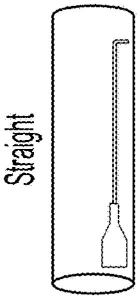
FIG. 44A through FIG. 44G show various example shapes for pipes and tubes where bent and curved nozzles can be used to print in the internal surfaces that the traditional 3D printers are unable to print on the internal surfaces of the shapes.
Figure 44B:
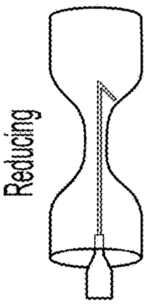
Figure 44C:
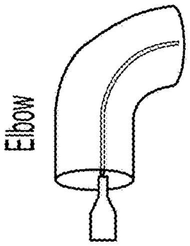
Figure 44D:
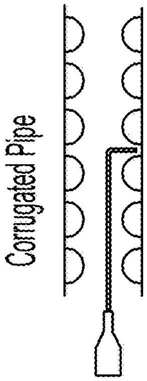
Figure 44E:
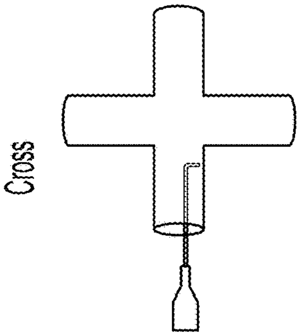
Figure 44F:
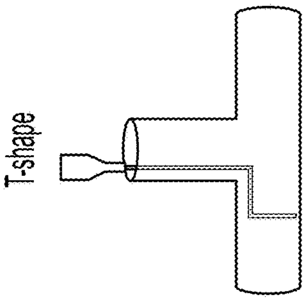
Figure 44G:
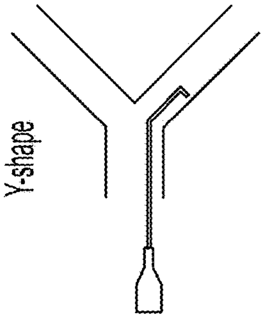

FIG. 44A shows the simplest case where a 90° bent nozzle can move inside the pipe to perform the printing. In FIG. 44B, the pipe has a reducing geometry where its diameter gets smaller and then expand again. In this case, the requirement is to print in the internal surface at the beginning of the expansion section. A nozzle that is bent by a degree that is less than 90 can achieve the goal. FIG. 44C demonstrate a curved nozzle that is inserted into an elbow pipe to perform the 3D printing. Printing in a corrugated pipe can also be done using bent nozzle as shown in FIG. 44 8D. In case of a cross shape, the bent nozzle can print inside one of the sides and then rotate the shape to print inside the other sides as illustrated in FIG. 44E. If the shape can not be rotated, it is possible to use a longer nozzle or a nozzle with multi-bent to reach the required regions. In FIG. 44F, a multi-bent nozzle is inserted into a T-shape pipe where the printing is taking place inside one of the channels. In another similar example, FIG. 44G, the multi-bent nozzle is used to print inside a Y-shape channel.

FIG. 45A through FIG. 45H illustrate various example shapes of hollow and partially open structures where bent and curved nozzles can be used to print on internal surfaces that the traditional 3D printers are unable to print on the interval surfaces of these structures.

Figure 45A:
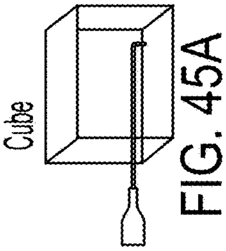
FIG. 45A through FIG. 45H illustrate various example shapes of hollow and partially open structures where bent and curved nozzles can be used to print on internal surfaces that the traditional 3D printers are unable to print on the interval surfaces of these structures.
Figure 45B:
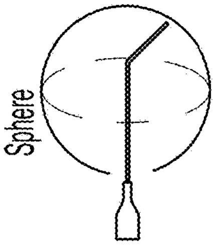
Figure 45C:
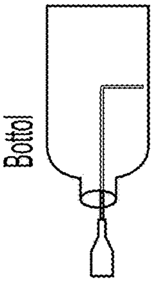
Figure 45D:
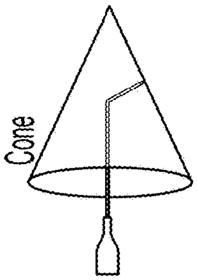

FIG. 45A demonstrates how a bent nozzle can be used to print inside a cube or duct. The cube may be open from one side, or the duct may have openings on two sides. A more complex example is shown in FIG. 45B, where printing is performed inside a sphere. Here, the bent nozzle enters the sphere through a small opening, and either the sphere or the nozzle rotates and moves. Accurate motion control is necessary to ensure the tip of the nozzle remains almost parallel to the internal surface of the sphere. While nozzles with a fixed bent angle may print in some regions inside the sphere, replacing the nozzle with one having the correct bent angle or using nozzles with dynamically adjustable bent angles can resolve these limitations. Additionally, printing inside a semi-spherical shape that is either fully open or partially open is achievable. FIG. 45C illustrates the capability to print inside a bottle using this method. To fit the nozzle into a sphere or bottle, the length of the nozzle between the bent portion and tip must be sufficient to pass through the initial opening of the structure. FIG. 45D shows the application of a bent nozzle to print inside a cone.

Figure 45E:
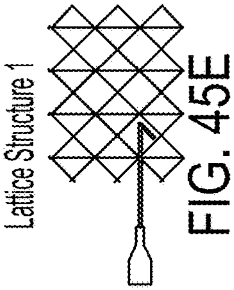
Figure 45F:
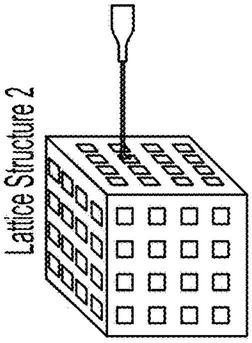
Figure 45G:
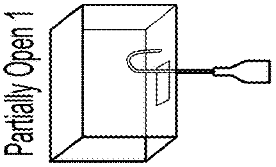
Figure 45H:
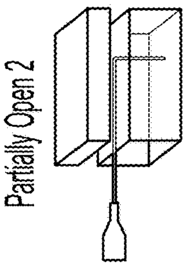

Printing inside partially open structures introduces numerous possibilities, as shown in the examples. FIG. 45E depicts a lattice structure where the bent nozzle enters the structure through one of its voids and performs printing. FIG. 45F illustrates another lattice structure where a bent nozzle is used to print inside small channels passing through a larger cube. This demonstrates the method's ability to print in confined spaces that cannot typically be accessed using traditional straight nozzles. Similarly, FIG. 45G shows printing within a fully enclosed cube that has only a small opening through which the nozzle passes, utilizing the available degrees of freedom for accurate printing. FIG. 45H presents an additional confined space scenario involving two closely positioned objects. The upper object is fully closed, while the lower object has only one opening at the top. These objects are stationary with only a small gap between them. To print inside the lower object, a bent nozzle of sufficient length is introduced into the space between the objects. The nozzle is then rotated so the tip remains parallel to the internal surface of the lower object. This represents a highly confined space requiring careful planning and precise calculations to ensure a successful print.

Figure 46:
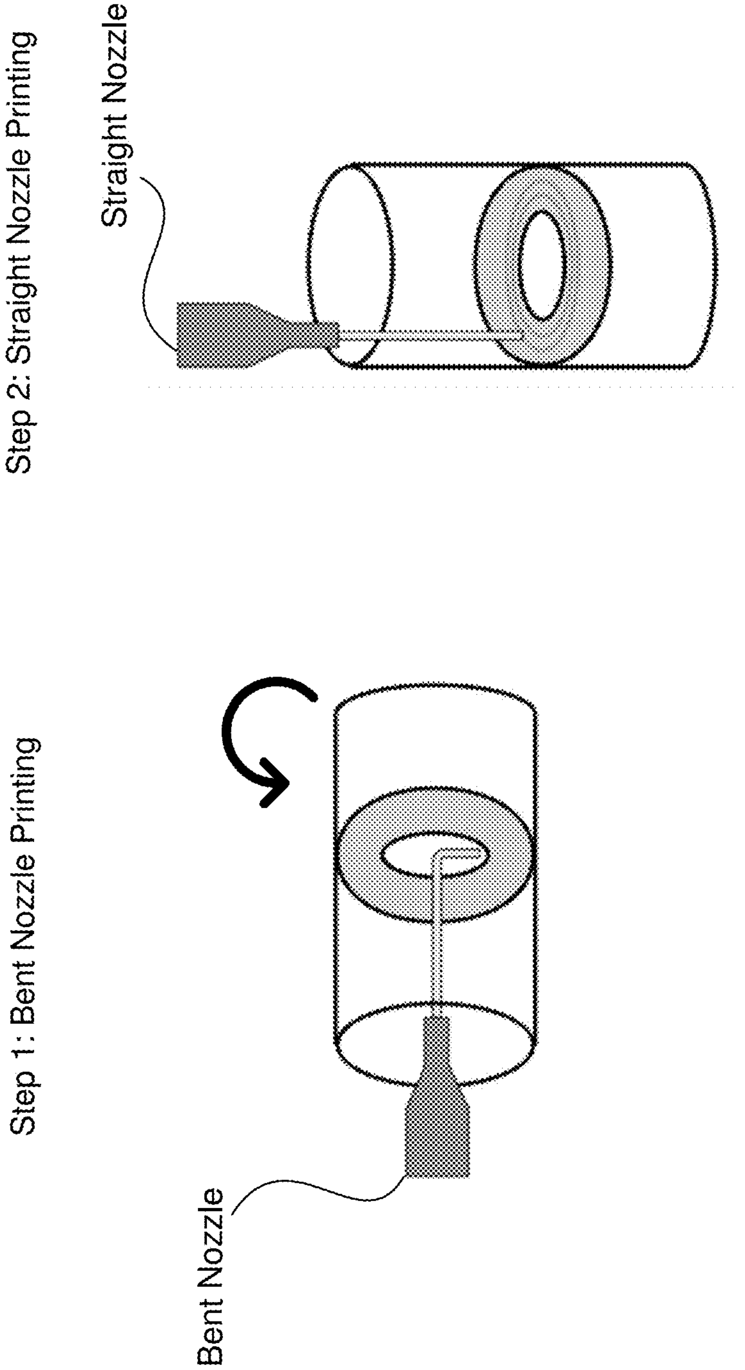
FIG. 46 illustrates a method of printing using both a bent nozzle and a straight nozzle in accordance with some implementations of the disclosure.

FIG. 46 illustrates a method of printing using both a bent nozzle and a straight nozzle in accordance with some implementations of the disclosure.

As shown, in the first step in FIG. 46, the bent nozzle is utilized to print a support structure on the internal surface of a pipe. As previously described, a rotator can be employed to rotate the pipe during this process. In the second step, a straight nozzle is used to print on the surface of the support structure. For instance, the straight nozzle allows for the creation of shapes that may be challenging or difficult to achieve using only bent and curved nozzles.

Figure 47:
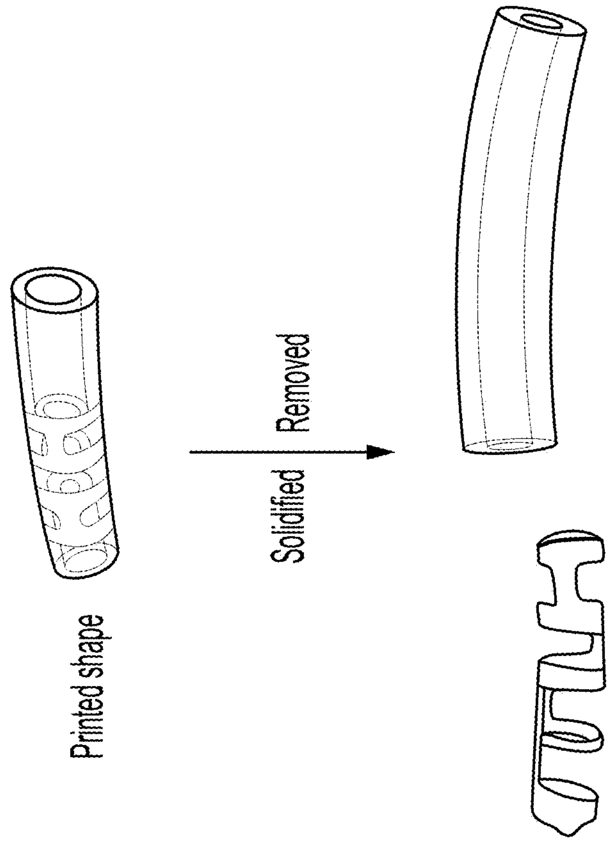
FIG. 47 shows a method of printing a structure using an internal surface of a hollow and partially open structure in accordance with some implementations of the disclosure.

FIG. 47 shows a method of printing a structure using an internal surface of a hollow and partially open structure in accordance with some implementations of the disclosure.

As shown, the internal 3D printing technique is not limited to creating designs within pipes, hollow, or partially open structures but can also be used to fabricate objects existing outside these structures. For example, the internal surfaces of such structures can act as temporary supports for objects that are difficult or impossible to print using conventional extrusion methods.

As illustrated in the example process, material is applied to the internal surface in the desired shape and allowed to solidify in step 1. This process has been previously described in detail above in FIG. 41 and FIG. 42.

In step 2, the printed structure is removed from the supporting pipe or structure. After the supporting pipe or structure is removed, the printed material retains its shape, even outside the original structure. This introduces a novel approach by utilizing internal surfaces as temporary support structures, replacing traditional support materials. These internal surfaces can be removed post-printing, allowing for the creation of complex shapes that are currently unattainable with standard 3D extrusion printing techniques. This innovation was experimentally validated, as shown in FIG. 47, where a tube was used to support the printed material.

This 3D internal surface printing technology provided in the present disclosure can be applied across a broad range of industries, offering transformative possibilities for creating complex internal structures with advantages in customization, design complexity, and material efficiency. The following examples applications.

The system enables the design and fabrication of intricate internal channels and patterns within pipes and tubes, directly influencing fluid dynamics. Through advanced design, the system can address challenges such as turbulent flow and vibrations. For example, in aerospace applications, this technology can mitigate vortex formation in fuel tanks—a common issue in these systems.

This method offers opportunities in medical applications, particularly for endoscopic procedures. Using bent nozzles, 3D printing can be performed in areas that are otherwise inaccessible with traditional straight nozzles. These nozzles overcome spatial constraints caused by vertical distances, allowing for printing directly on arterial walls or other difficult-to-reach internal regions. This expands the potential for medical 3D printing applications in confined and sensitive anatomical spaces.

Heat transfer applications benefit significantly from this technology by enabling the creation of heat exchangers with complex internal geometries. These designs optimize surface area and enhance heat transfer efficiency, beneficial for industries such as power generation, chemical processing, and HVAC systems. Moreover, these geometries can be tailored to specific thermal management needs, offering customized solutions for aerospace, automotive, and industrial machinery.

The system allows for the fabrication of internal lattice structures and complex support geometries within walls to strengthen components while minimizing weight. This has applications across industries such as aerospace, automotive, construction, and robotics. In the medical field, biocompatible materials can be printed onto weakened arterial sections to provide structural reinforcement.

The system can also be employed for in-situ repair of cracks in pipes and tubes by precisely depositing repair materials onto damaged internal surfaces. This eliminates the need for traditional, cumbersome repair methods, particularly in areas that are difficult to access. The result is a seamless and efficient repair solution.

In the field of research and development, this technology enables the creation of complex shapes and geometries previously unattainable, facilitating real-time experimentation in material science and engineering. Researchers can move beyond simulation with low-cost, rapid, and highly customizable 3D printing options, accelerating innovation and discovery.

Leveraging internal surfaces as support structures enables the printing of complex geometrical shapes and exploration of new materials that are not viable using traditional extrusion methods. This innovation expands design possibilities and allows for advanced material applications that take advantage of internal support mechanisms.

This 3D internal surface printing system offers a versatile and innovative approach to solving technical challenges across industries. Its potential applications extend from aerospace and medicine to heat transfer, repair, and advanced manufacturing, demonstrating its wide-ranging capabilities and transformative potential.

Figure 48:
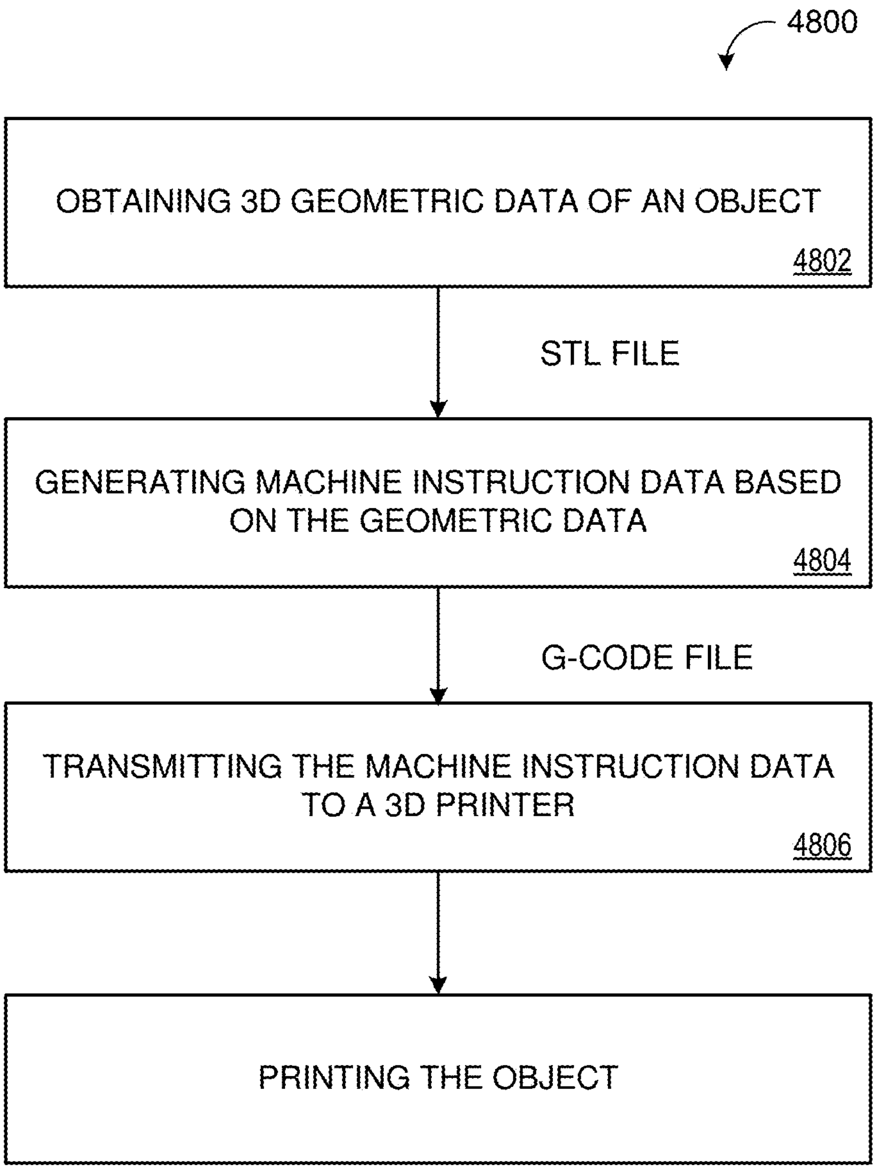
FIG. 48 is a flowchart of an example arrangement of operations for a method of printing a 3D object in accordance with some implementations of the disclosure.

FIG. 48 is a flowchart of an example arrangement of operations for a method 4800 of printing a 3D object in accordance with some implementations of the disclosure.

The method 4800 may be performed by a computing device that may include hardware (circuitry, dedicated logic, data processing hardware etc.), software (such as is run on a general purpose computer system or a dedicated machine) on memory hardware, or a combination of both, which computing device may be included in any computer system or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 4800, at operation 4802, includes obtaining 3D geometric data (e.g., stereolithography (STL) file) of a desired object. In some implementations, Computer-Aided Design (CAD) software creates the geometric design of the desired object which is then exported as a stereolithography (STL) file representing the 3D geometric data.

The method 4800, at operation 4804, includes generating machine instruction data (e.g., G-code file) based on the 3D geometric data (e.g., STL file). In some implementations, based on the 3D geometric data, slicing software generates precise machine instruction data (e.g., G-code file) for the 3D printer.

The method 4800, at operation 4806, includes transmitting the machine instruction data (e.g., G-code file) to a controller of a 3D printer. In some implementations, the machine instruction data includes at least one of a first instruction or a second instruction. The first instruction causes a controller of a first 3D printer (e.g., 3D printer with a rotating extruder) to transmit a signal to an extruder of the first 3D printer, causing the extruder to rotate. The second instruction causes a controller of a second 3D printer to transmit a signal to a rotator of the second 3D printer, causing the rotator to rotate an object, thereby enabling the second 3D printer to print on the internal surface of the object.

Based on the machine instruction data, the 3D printer prints the desired object.

Figure 49:
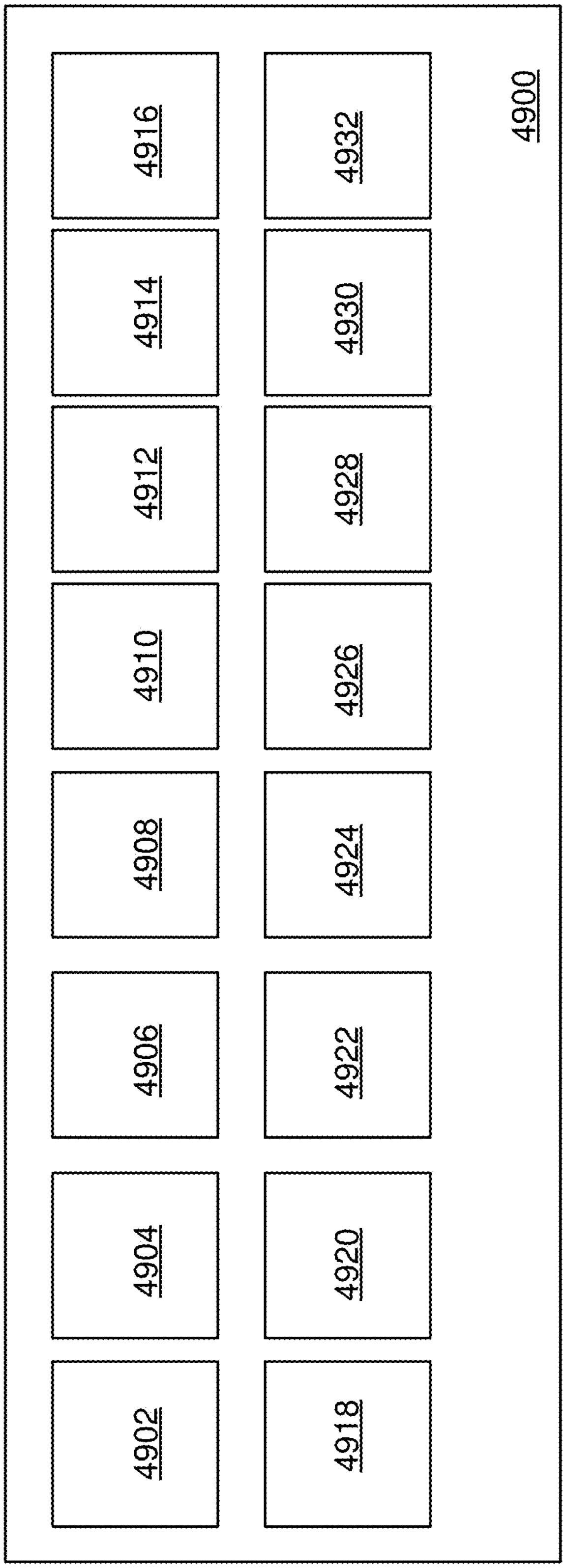
FIG. 49 shows basic blocks of an example controller (e.g., control board) for a 3D printer that may be used to implement the systems and methods described in this disclosure.

FIG. 49 shows basic blocks of an example controller (e.g., control board) for a 3D printer that may be used to implement the systems and methods described in this disclosure.

The controller 4900 includes microcontroller/processor 4902, motor drivers 4904, voltage regulators 4906, heating element controllers 4908, temperature sensors 4910, stepper motor connectors 4912, fan headers 4914, endstop/limit switch inputs 4916, communication ports 4918, display interfaces 4920, power connectors 4922, firmware storage 4924, peripheral interfaces 4926, LEDs 4928, expansion ports 4930, and safety features 4932.

The 3D printer controller 4900 includes of several components that work together to manage the printer's operations and provide flexibility for customization. At its core, the microcontroller/processor 4902 acts as the "brain" of the system, executing firmware instructions and coordinating the various operations of the printer. Examples of microcontrollers include ARM-based processors like the STM32 series and ATmega chips, such as the ATmega2560 in older boards.

Motor drivers 4904 are important for controlling the stepper motors that drive the X, Y, and Z axes, as well as the extruder. In this example, the motor drivers 4904 controls the rotating motion of the extruder. In other example, the motor driver 4904 controls a rotator for rotating a holder holding an object. These drivers can be integrated or modular and are often chosen based on the type of motor being used. Examples include TMC series drivers (TMC2208, TMC2209, TMC5160) and A4988 drivers. To ensure proper operation, voltage regulators 4906 are included to convert the higher voltage from the power supply to the appropriate levels required by the board and peripherals, such as logic circuits, heating elements, and motors.

To manage the temperatures of the hotend and heated bed, heating element controllers 4908 regulate the power to these components, typically using MOSFETs or relays. Temperature sensors 4910, such as thermistors or thermocouples, monitor the temperature of critical components like the hotend and heated bed. These sensors play a vital role in maintaining precise temperature control during printing.

The control board also features connectors 4912 for stepper motors, which interface with the motors controlling movement and extrusion, and fan headers 4914 to regulate the cooling fans for the hotend, print object, or control board. Endstop or limit switch inputs 4916 detect the boundaries of the printer's movement along the axes, with options such as mechanical switches, optical endstops, or sensorless homing.

Communication ports 4918 allow for data transfer between the control board and external devices. These may include USB ports for connecting to computers, SD card slots for loading G-code files, and Wi-Fi or Ethernet capabilities for wireless control and monitoring. Display interfaces 4920, such as SPI, I2C, or UART, enable the connection of touchscreens or LCD displays for user interaction.

The control board's power connectors 4922 distribute power to various components, including high-current loads like the heated bed and hotend. Expansion ports 4930 provide the ability to add modular components, such as additional motor drivers or advanced sensors, to support customized features. Firmware storage 4924, typically in the form of flash memory or EEPROM, holds the firmware that governs the operation of the printer.

Safety is a critical consideration in 3D printing, and the control board includes safety features 4932 like fuses to prevent electrical overloads, thermal cutoffs to shut down heating elements if temperatures exceed safe thresholds, and watchdog timers to restart the microcontroller in case of software faults. Peripheral interfaces 4926 support additional functionalities, such as auto bed leveling sensors, filament runout sensors, or manual input through rotary encoders or buttons. Finally, LEDs 4928 provide status indicators for power, heating, communication, or error alerts, ensuring that users are always informed of the printer's condition.

These components collectively ensure the functionality, safety, and flexibility of modern 3D printers, enabling a wide range of customization options for various printing needs.

Figure 50:
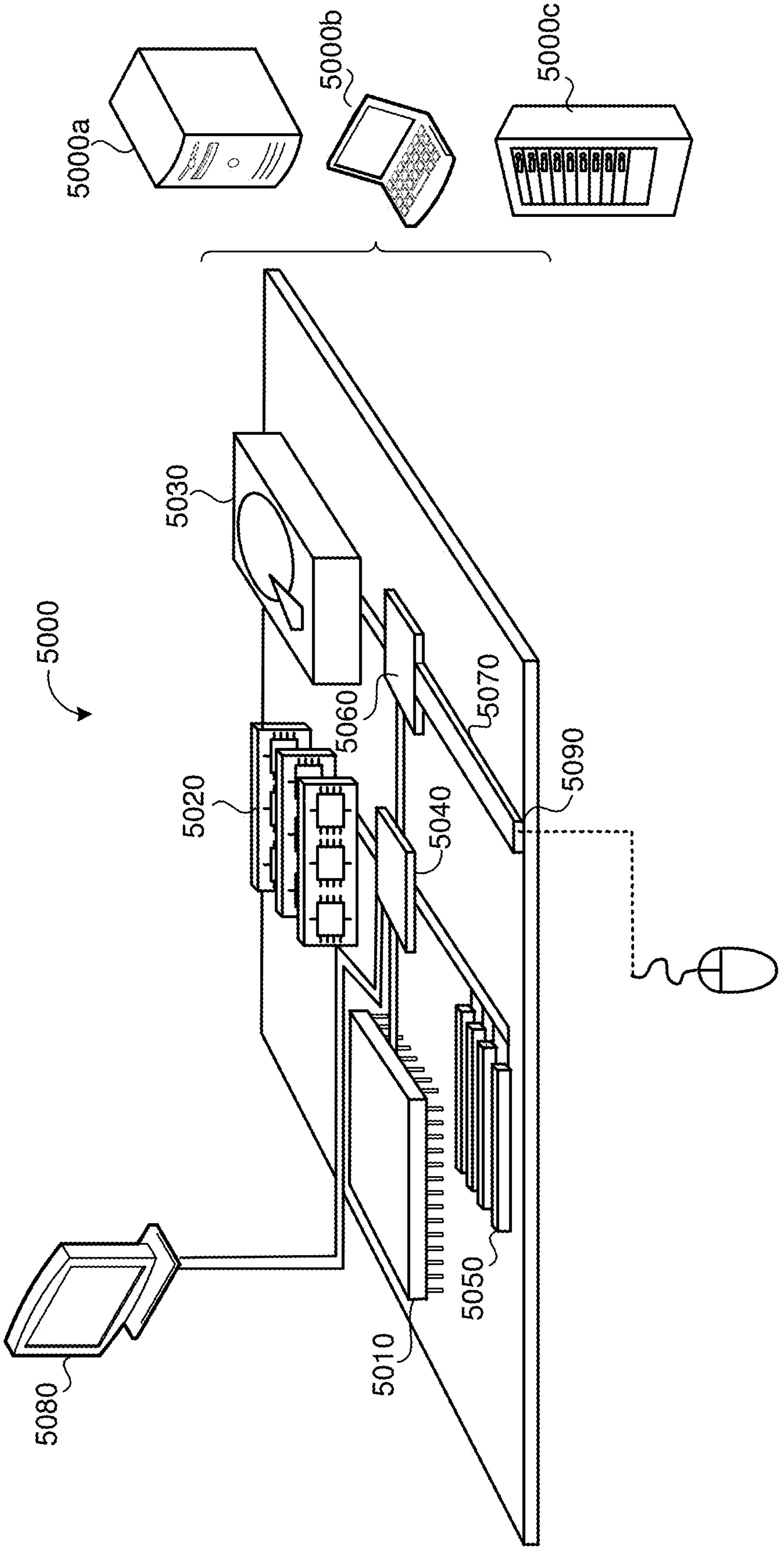
FIG. 50 is schematic view of an example computing device 5000 that may be used to implement the systems and methods described in this disclosure.

FIG. 50 is schematic view of an example computing device 5000 that may be used to implement the systems and methods described in this disclosure.

In some implementations, the computing device 5000 generates geometric data (e.g., STL file). In some implementations, the computing device 5000 generates machine instruction data (e.g., G-code file).

The computing device 5000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 5000 includes a processor 5010, memory 5020, a storage device 5030, a high-speed interface/controller 5040 connecting to the memory 5020 and high-speed expansion ports 5050, and a low-speed interface/controller 5060 connecting to a low speed bus 5070 and a storage device 5030. Each of the components 5010, 5020, 5030, 5040, 5050, and 5060, are interconnected using various busses, and may be mounted on a common motherboard or in other manners as appropriate. The processor 5010 can process instructions for execution within the computing device 5000, including instructions stored in the memory 5020 or on the storage device 5030 to display graphical information for a graphical user interface (GUI) on an external input/output device, such as display 5080 coupled to high-speed interface 5040. In other implementations, multiple processors and/or multiple buses may be used, as appropriate, along with multiple memories and types of memory. Also, multiple computing devices 5000 may be connected, with each device providing portions of the necessary operations (e.g., as a server bank, a group of blade servers, or a multi-processor system).

The memory 5020 stores information non-transitorily within the computing device 5000. The memory 5020 may be a computer-readable medium, a volatile memory unit(s), or non-volatile memory unit(s). The non-transitory memory 5020 may be physical devices used to store programs (e.g., sequences of instructions) or data (e.g., program state information) on a temporary or permanent basis for use by the computing device 5000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 5030 is capable of providing mass storage for the computing device 5000. In some implementations, the storage device 5030 is a computer-readable medium. In various different implementations, the storage device 5030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 5020, the storage device 5030, or memory on processor 5010.

The high speed controller 5040 manages bandwidth-intensive operations for the computing device 5000, while the low speed controller 5060 manages lower bandwidth-intensive operations. Such allocation of duties is exemplary only. In some implementations, the high-speed controller 5040 is coupled to the memory 5020, the display 5080 (e.g., through a graphics processor or accelerator), and to the high-speed expansion ports 5050, which may accept various expansion cards (not shown). In some implementations, the low-speed controller 5060 is coupled to the storage device 5030 and a low-speed expansion port 5090. The low-speed expansion port 5090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 5000 may be implemented in a number of different forms, as shown in the figure. For example, it may be implemented as a standard server 5000*a* or multiple times in a group of such servers 5000*a*, as a laptop computer 5000*b*, or as part of a rack server system 5000*c*.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. It will also be understood that the phrase at least one of successive elements separated by the word "and" (e.g., "at least one of A and B") is to be interpreted the same as the term "and/or" and as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

While the preceding discussion is generally provided in the context of a material used in connection with plastics, epoxies, and metals for 3D printing, it should be appreciated that the present techniques are not limited to such limited contexts. The provision of examples and explanations in such a context is to facilitate explanation by providing instances of implementations and applications. The disclosed approaches may also be utilized in other contexts or configurations.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. An extruder for printing an object, the extruder comprising:

a housing including:

a first base;

a plurality of holes in the first base; and a plurality of nozzle holders on the first base; and a rotator coupled to the housing, wherein the rotator rotates the housing during a 3D printing process.

2. The extruder of claim 1, further comprising a coupler that couples the extruder to a slider of a 3D printer.

3. The extruder of claim 1, further comprising:

a first plurality of nozzles, each nozzle of the first plurality of nozzles associated with a corresponding nozzle holder of the plurality of nozzle holders.

4. The extruder of claim 3, wherein one or more of the first plurality of nozzles is bent or curved.

5. The extruder of claim 3, wherein at least one of the first plurality of nozzles is bent to an angle between 1° and 359°.

6. The extruder of claim 3, wherein each nozzle of the first plurality of nozzles is in fluid communication with a printing material source.

7. The extruder of claim 3, further comprising a second base and a second plurality of nozzles on the second base.

8. The extruder of claim 7, wherein each nozzle tip of the first plurality of nozzles and each nozzle tip of the second plurality of nozzles faces a printing bed through the plurality of holes in the first base.

9. The extruder of claim 7, wherein:

each nozzle of the first plurality of nozzles is bent to a first angle between 1° and 359°;

each nozzle of the second plurality of nozzles is bent to a second angle between 1° and 359°; and the second angle is greater than the first angle.

10. The extruder of claim 9, further comprising a third plurality of nozzles, wherein:

each nozzle of the third plurality of nozzles is bent to a third angle between 1° and 359°; and the third angle is greater than the first angle and the second angle.

11. A 3D printer for printing on an internal surface of an object, the 3D printer comprising:

a nozzle;

a first axis slider associated with the nozzle;

a holder for holding the object, wherein the holder is configured to secure a hollow and partially open structure of the object;

a rotator for rotating the holder during a 3D printing process, wherein the nozzle is bent or curved, and wherein the nozzle is configured to insert into a hollow space of the hollow and partially open structure as the first axis slider moves forward during the 3D printing process.

12. The 3D printer of claim 11, further comprising a second axis slider associated with the nozzle, the second axis slider movable transversely to the first axis slider.

13. The 3D printer of claim 12, wherein the first axis slider includes a first rail and a first motor configured to move the nozzle along the first rail; and the second axis slider includes a second rail and a second motor configured to move the nozzle along the second rail.

14. The 3D printer of claim 11, further comprising a print material supplier in fluid communication with the nozzle.

15. The 3D printer of claim 14, further comprising a controller, wherein the controller transmits a signal to the print material supplier that causes the nozzle to deposit printer material to an internal surface of the object.

16. The 3D printer of claim 11, wherein the holder includes gear teeth along its surface, and wherein the rotator includes a motor operatively coupled to the gear teeth to rotate the holder.

17. The 3D printer of claim 11, further comprising a controller, wherein at least one of:

the controller transmits a signal to the first axis slider that causes the nozzle to move along a first axis in a forward direction, a backward direction, or a combination of forward and backward directions during the 3D printing process;

the controller transmits another signal to the rotator that causes the holder to rotate the object in a clockwise direction, a counterclockwise direction, or a combination of both during the 3D printing process.

18. A method of printing a 3D object, the method comprising:

obtaining 3D geometric data of the 3D object;

generating machine instruction data based on the 3D geometric data, the machine instruction data including instructions for a 3D printer, wherein the instructions include at least one of a first instruction and a second instruction, the first instruction causing an extruder of a first 3D printer to rotate, the second instruction causing a rotator of a second 3D printer to rotate an object, enabling the second 3D printer to print on an internal surface of the object.

19. The method of claim 18, wherein the extruder comprises:

a housing including:

a first base;

a plurality of holes in the first base; and a plurality of nozzle holders on the first base; and a rotator coupled to the housing, wherein the rotator rotates the housing based on the first instruction.

20. The method of claim 18, wherein the second 3D printer comprises:

a nozzle;

a first axis slider associated with the nozzle;

a holder for holding an object;

a rotator operable to rotate the holder in response to the second instruction, wherein the nozzle is bent or curved.

* * * * *